United States Patent [19]

Cerimele et al.

[11] Patent Number: 5,064,151
[45] Date of Patent: Nov. 12, 1991

[54] ASSURED CREW RETURN VEHICLE

[75] Inventors: Christopher J. Cerimele, Houston; Robert C. Ried, Friendswood; Wayne L. Peterson, Webster; George A. Zupp, Jr., Friendwood, all of Tex.; Michael J. Stagnaro, Canoga Park, Calif.; Brian P. Ross, Louisville, Ky.

[73] Assignee: The United States of Americas as represented by the Administrator of the National Aeronautics and Space Administration, Washington, D.C.

[21] Appl. No.: 458,476

[22] Filed: Dec. 28, 1989

[51] Int. Cl.⁵ .............................................. B64G 1/62
[52] U.S. Cl. .................................. 244/160; 244/163; 244/162
[58] Field of Search ............ 244/160, 162, 163, 158 R, 244/158 A, 1 R

[56] References Cited

U.S. PATENT DOCUMENTS

| | | | |
|---|---|---|---|
| D. 211,104 | 5/1968 | Steadman | D21/86 |
| 3,079,113 | 2/1963 | Meyer, Jr. | 244/162 |
| 3,093,346 | 6/1963 | Jaget et al. | 244/162 |
| 3,118,636 | 1/1964 | Kantrowitz et al. | 244/162 |
| 3,270,985 | 9/1966 | Schmidt | 244/162 |
| 3,301,507 | 1/1967 | Mayo et al. | 244/160 |
| 3,606,212 | 9/1971 | Paine | 244/162 |
| 4,817,895 | 4/1989 | Scott et al. | 244/160 |
| 4,856,294 | 8/1989 | Scaringe et al. | 165/902 |

Primary Examiner—Joseph F. Peters, Jr.
Assistant Examiner—Anne E. Bidwell
Attorney, Agent, or Firm—Hardie R. Barr; Harold W. Adams; Edward K. Fein

[57] ABSTRACT

The invention teaches a return vehicle for use in returning a crew to Earth from low earth orbit in a safe and relatively cost effective manner. The return vehicle comprises a cylindrically-shaped crew compartment attached to the large diameter of a conical heat shield having a spherically rounded nose. On-board inertial navigation and cold gas control systems are used together with a de-orbit propulsion system to effect a landing near a preferred site on the surface of the Earth. State vectors and attitude data are loaded from the attached orbiting craft just prior to separation of the return vehicle.

6 Claims, 35 Drawing Sheets

Three main parachutes extracted by mortar deployed pilot chutes

Rate of descent
Vv - 29 ft/sec
Main parachutes reefed in two steps

Drogue chutes disconnected
Three pilot chutes mortar deployed
altitude ~10,000 ft Two drogue chutes mortar deployed at
T + 1.6 sec Apex cover ejected by pyro-thruster and 7.2 ft dia ringslot parachute
time - 0 sec Start of recovery
altitude - 25,000 ft
velocity - 0.7 mach

|                          | Hemisphere | Apollo | MOSES | SCRAM |
|--------------------------|------------|--------|-------|-------|
| Surface Area, ft²        | 567        | 487    | 649   | 434   |
| Volume, ft³              | 1092       | 828    | 1304  | 512   |
| Maximum Diameter, ft     | 14.5       | 14.5   | 14.5  | 14.0  |
| Length, ft               | 9.1        | 10.1   | 12.0  | 7.6   |
| C.G., % of length        | 43.3       | 32.4   | 41.4  | 49.6  |
| Weight, lb               | 9876       | 9047   | 10581 | 9231  |
| W/CdA                    | 65.7       | 36.8   | 95.6  | 37.2  |
| Diameter                 | 3.95'      | 3.28'  | 4.95' | 3.77' |
|                          | Fig. 1A    | Fig. 1B| Fig. 1C| Fig. 1D |

ASSURED CREW RETURN VEHICLE

ORIGIN OF THE INVENTION

The invention described herein was made by employees of the United States Government and may be manufactured or used by or for the Government of the United States of America for governmental purposes without the payment of any royalties thereon or therefor.

BACKGROUND OF THE INVENTION
1. Field of the Invention

The invention relates to space transportation and exploration vehicles and more particularly, to a space vehicle which may be employed to reliably and safely return crew members from an earth orbiting vehicle, such as a space station or the like, to the earth with a minimum of cost and on-orbit preparation.

2. Brief Description of the Related Art

Since the beginning of the manned space program, NASA has been concerned with an Assured Crew Return Capability (ACRC). During the Mercury and Gemini programs, the design of the first orbit's trajectory assured the return of the vehicle into the atmosphere. The early Apollo missions to the Moon were flown in a "free return" trajectory, where the vehicle could circle the Moon and return home automatically. The value of this philosophy was demonstrated when the Lunar Module was used as an emergency vehicle on the Apollo 13 Mission. The Skylab missions had an Apollo Command Module docked to it during manned occupancy. (A method also used by the Soviet Union in its MIR space station.) The Space Shuttle provides a high level of redundancy for critical systems for the same reason. Likewise, the Space Station Freedom is being designed today with provisions for ACRC.

The Space Station Freedom is being developed as a permanent, manned vehicle located in low Earth orbit (LEO). The Space Shuttle will be used to deliver Space Station Freedom elements to orbit and provide crew rotation and space station logistics. The cycle time for Space Shuttle deliveries to the manned Space Station Freedom is expected to be about 3 months.

Unlike previous manned space vehicles, the permanently orbiting facility will not inherently return the crew to earth. Consequently, a crew return module is being developed which would always be docked at the Space Station Freedom to assure return for the Space Station Freedom crew. At least three situations have been identified where such a return module is essential: (1) In a medical emergency, where a crew member suffers a severe injury or illness which exceeds the capability of the Space Station Freedom's medical facilities, and the Space Shuttle cycle time is inadequate. (2) Space Station Freedom catastrophe during a period when the Space Shuttle Orbiter is away from the station. (3) Space Shuttle program problems which might prevent a timely availability of the Space Shuttle.

The design philosophy for the return vehicle is to "keep it simple," which implies high reliability and low maintenance. Consistent with this philosophy, subsystems would be passive where appropriate and would be "off the shelf" items, implying no technology risk. The Space Station Freedom interfaces will be at a minimum, particularly in the areas of maintenance, state of health monitoring, training, and operations.

Mission time should be at a minimum consistent with flight safety rules and procedures. This will typically reduce the size, weight, and performance requirements of the subsystems. This also implies that it is acceptable to have "large" dispersions between the touchdown point and the desired target area.

Once the return vehicle is in the water, primary rescue will be performed by the world-wide search and rescue (SAR) forces. Since the rescue time could be on the order of a day, the qualities of the return vehicle's flotation dynamics will be maximized along with crew comfort requirements that are consistent with crew safety. It should be noted that these design assumptions do not address the medical requirement of having available imminent hospital care for an injured crewmember, but emphasize the benchmark for simplicity.

The technology required to return people safely from orbit is not new and the ACRV is based on the heritage of prior entry spacecraft. Further, the ACRV has no "up" requirements and, as such, allows the design to have the freedom of increased simplicity. It is tempting in a design study of an ACRV for the Space Station Freedom, to focus on the active phase for such a system. However, the novel and most challenging design aspects of the ACRV lie in the quiescent phases of this system, particularly in being on the Space Station Freedom for an extended period of time yet always available for a safe, reliable return when needed. High reliability after an extended dormant period and minimum interface with the Space Station Freedom (and the associated maintenance, integration, logistics, and resupply) dictates a system which is as passive and simple as possible. The return vehicle concept described herein has addressed simplicity and passiveness through minimizing on-orbit loiter time and associated system requirements while providing an aerodynamically stable ballistic entry vehicle as well as a seaworthy craft. It is proposed that a simple ACRV such as the return vehicle can complement the Space Shuttle Transportation System by providing an assured crew return capability for all needs.

To successfully design such a system, a number of physical vehicle configuration requirements must be met. Delivery to the Space Station Freedom in the Orbiter payload bay demands that the vehicle diameter be less than 15 ft., that it be able to withstand Space Shuttle launch loads, and that it be compatible with Space Shuttle systems. A requirement for rapid ingress, checkout, and release must also be met in the event of an Space Station Freedom catastrophe. This requires acceptable thermal conditions for instantaneous use of all vehicle systems and crew compatibility in a shirtsleeve environment. Also, due to the extended crew on-orbit times, the training and proficiency required by the return vehicle for mission success must be minimized.

On-orbit and entry trajectory considerations also mandate a number of vehicle and system requirements. The vehicle must have the capability to deorbit from the Space Station Freedom and safely return the crew to Earth. A maximum free-flight time of 3 hours was imposed in an effort to have a completely passive environmental control and life support system (ECLSS) as well as reduce the power requirements of the vehicle. Crew physiological constraints limit the entry loading to 10 g's for less than 1 minute, and these loads can be over 3 g's for less than 5 minutes. Crew survival for both water and land landings will be met by providing impact attenuation in addition to the parachute system.

The minimum mission time and passivity of design imposed on the vehicle limits the amount of loiter time the vehicle can orbit the Earth in search of an opportune landing site. In turn, this limits the ability of the vehicle to always land near a rescue site. The imperative of this design was the reliable, safe return of the crew with simple, passive systems, which necessitates some compromise in accurate landing at choice sites. If the vehicle does land a large distance from a rescue site, the crew might have to wait for extended periods of time before being rescued. An assured buoyancy capability requires that the vehicle e a seaworthy craft. Basic survival necessities are also required along with a commercially available rescue beacon.

A brief description of some of the known related art follows:

Steadman U.S. Pat. No. 211,104 discloses the design of a toy having a shape somewhat similar to the instant invention.

Faget, et al, U.S. Pat. No. 3,093,346 discloses a space capsule having the capability to return humans to earth from earth orbit along a ballistic trajectory by use of retro-firing rockets. The patent teaches a capsule having a cylindrically- shaped portion, a conically-shaped portion and a heat shield Schmidt U.S. Pat. No. 3,270,985 discloses a reaction control system in the context of a similarly shaped vehicle.

Paine U.S. Pat. No. 3,606,212 teaches an emergency rescue vehicle having some of the features of present invention.

SUMMARY OF THE INVENTION

The invention contemplates an assured crew return capability by providing a return vehicle which is launched into orbit within the cargo bay of the Space Shuttle Orbiter. The configuration of the return vehicle is such as to accommodate a ballistic reentry trajectory and have a stable flotation attitude. Re-entry employs a closed-loop guidance system during deorbit burn. The return vehicle provides a passive environmental life support system with separate cooling means for crew and electronics and compressed, bottled air for crew breathing.

A non-integrated sphere-cone heat shield which is spaced from the crew module by struts whereby water may enter the void between the crew module and the heat shield to provide flotation stability is shown. The return vehicle provides a non- integrated, modular and expendable propulsion system. Navigation is accomplished by a computer and inertial measurement unit using initialization data from the Space Station Freedom. An automatic reaction control system is employed for attitude control with an optional roll rate to null out lift during entry.

BRIEF DESCRIPTION OF THE DRAWINGS

FIG. 1 is a summary of various configurations (shown in FIGS. 1A-1D) considered in the development of the return vehicle.

DETAILED DESCRIPTION OF THE PREFERRED EMBODIMENT

Figure 2:
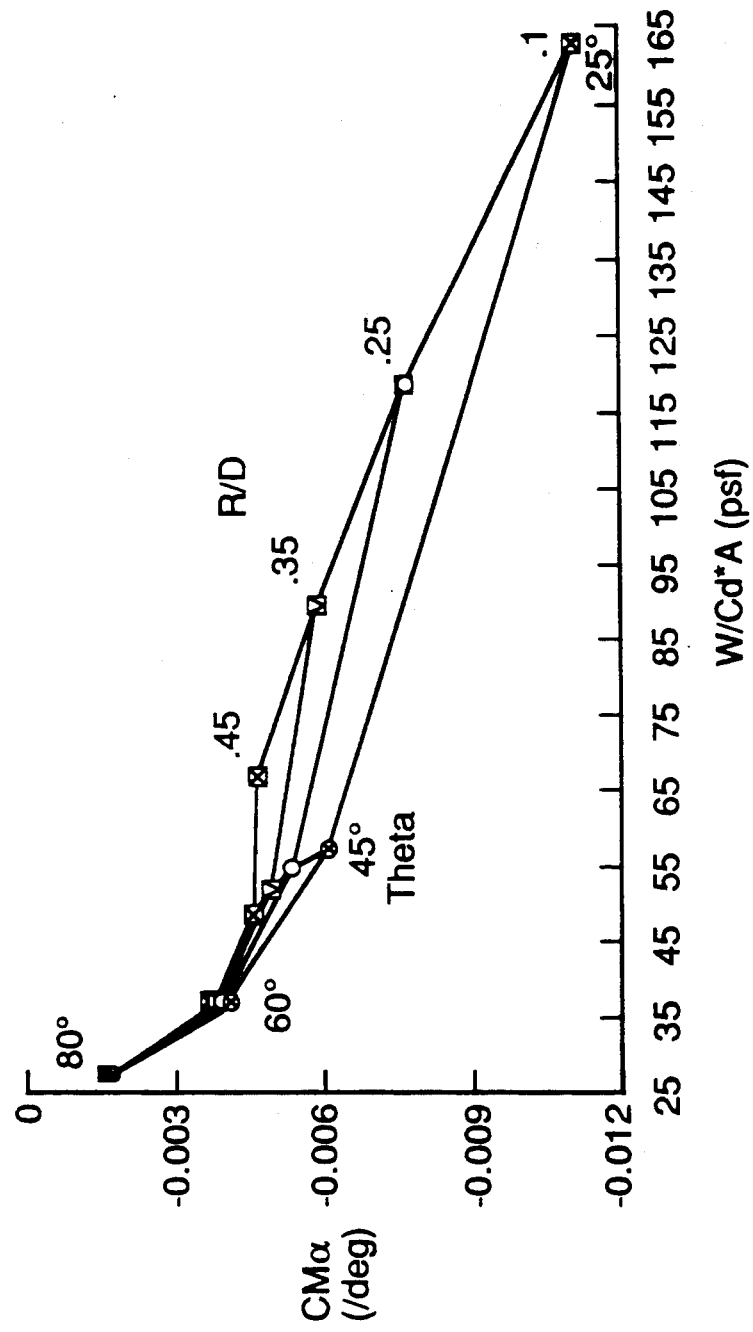
FIG. 2 is a graph showing the resulting ballistic coefficients and Cm-alphas of the various shield-shapes assuming a constant crew capsule size and weight.

Basic configuration trades were defined as those vehicle and mission features which characterize the overall performance and methodology of the return scenario. They affect some crucial parameters such as design philosophy, vehicle capability, loads, targeting, and mission time.

Perhaps the most important of these trades was that of design complexity versus mission time. For example, limiting mission time permits minimizing the environmental control system complexity, which results in a reduced capability in landing site selection due to a lack of loiter time. In order to increase the mission time, the design complexity would have to be escalated, particularly in the areas of life support, environmental control, power, propulsion, and avionics. The return vehicle design chosen utilizes the maximum time available from a passive ECLSS (3 hours) and compromises the ability to land to just a few select sites. This, in turn, mandates longer buoyancy periods after splashdown which necessitated providing a stable flotation vehicle which also is of a passive nature.

To attain the stable flotation configuration, historical shapes were traded against a new design. Shapes such as a sphere, the Apollo capsule, or the MOSES-type vehicle (a variation of a capsule used to return small payloads from Earth orbit) have developed extensive data bases in aerodynamics and flight characteristics. However, when designed for the return vehicle mission (FIG. 1 (a), (b), and (c)) and analyzed in a buoyant state, these configurations tend to float high in the water with little displacement. As a result, they lack stability in high seas or during crew egress.

A design was selected which provides a heat shield spaced apart from the crew module (FIG. 1 (d)). This allows water to fill the void between the shield and module providing dynamic damping. This allows the vehicle to "track" the water level, even in high seas. In addition, this design allows selection of a shield type that has a historical data base since entry aerodynamics, aerothermodynamics, and trajectory control are primarily determined by shield shape.

Non-integration of the propulsion system was chosen for the return vehicle. The advantages of a modular, expendable propulsion system which separates from the crew module before entry include ease of system changeout, elimination of hazardous fuel at landing, and lower entry weight, thereby reducing heating and deceleration loads. The compactness of a totally integrated propulsion system did not warrant its use over the modular design.

Another trade that was analyzed involved whether to fly the vehicle in a lifting orientation or a ballistic mode. In the lifting case, the center of gravity (c.g.) of the entry configuration must be accurately placed off of the centerline to produce the desired trim angle-of-attack and lift-to-drag ratio (L/D). This can be a delicate and complex requirement in a crew return vehicle which may vary in the number of crewmembers. Although a ballistic entry requires a c.g. on the centerline, the requirement is not as stringent because seating is easily arranged around the centerline and a small entry roll rate can be induced to null out small lift vectors. A lifting entry also requires a bank angle guidance and control loop during entry, while a ballistic entry can require essentially no guidance and control. Benefits of the lifting mode include a reduction of entry g-loads and a possible reduction of the landing footprint due to active entry targeting. The project goal of simplicity and passivity drove the decision towards the ballistic configuration and accepts the additional crew discomfort and rescue time involved. This decision did not compromise the probability of mission success or reliability.

With a ballistic entry, it is desirable to minimize the ballistic coefficient (W/CDA) to reduce entry g-loads (a more detailed discussion is included in section 1.-Aerodynamics). This implies that the full diameter of the Space Shuttle payload bay should be utilized for the return vehicle shield or capsule diameter to increase the heat shield reference area (A). As a result, configurations such as Apollo's became very voluminous for the designated 6-person crew. The non-integrated configuration allowed design of the crew module to be based solely on crew and environmental considerations. Unlike Apollo-type vehicles which had to be mounted to the top of a launch configuration, the return vehicle crew module could be designed for volumetric efficiency without regard to entry or launch.

With the available volume behind a 10 ft. diameter shield, a crew size of up to 8 could be accommodated without extending the crew module into the afterbody flow. It was determined, however, that maximum benefit is achieved with a 6- person design due to flexibility in returning the Space Station Freedom crew. It is desirable to maintain two CERV's at the Space Station Freedom if the necessity arises to return an ill or injured crewmember without jeopardizing the entire mission. A healthy crewmember is required to accompany a sick crewmember on a return flight. With the nominal 8-person crew onboard the Space Station Freedom, the remaining 6 crewmembers can return later if necessary in the second ACRV. Thus, a ACRV designed to carry more than 6 crewmembers is not warranted. Likewise, a ACRV capable of returning less than 6 crewmembers would either require that more than two vehicles be present at the Space Station Freedom or additional crewmembers be returned with the incapacitated crewmember.

Subsystem Description

The following sections give a detailed description of each subsystem along with the requirements used for the design and selection of the subsystem. For many of the subsystems, several design options were available. A brief description of each option is given along with the selected system description.

1. Aerodynamics

The alternatives considered for an aerodynamic design originally were the three configurations shown in FIG. 1. The vehicles are intended to fly ballistically at a zero angle-of- attack during the entry of the return vehicle mission. The ballistic coefficient and moment slope with respect to the angle- of-attack (Cm-alpha) are important design parameters for a ballistic entry. The heat shield chosen for the final return vehicle design was based on these parameters as well as on the availability of a historical data base. In light of the original three configuration analyses, it was desirable to attempt to achieve the large stability (negative Cm-alpha) of the MOSES design and the low ballistic coefficient of the Apollo design for lower entry loads.

Figure 3:
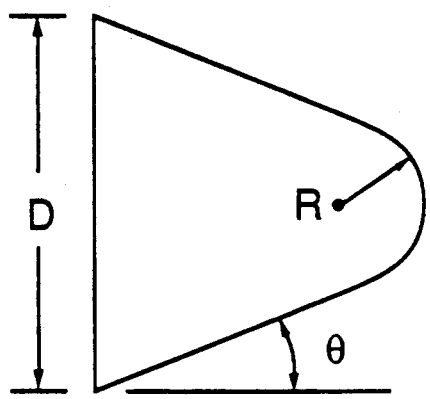
FIG. 3 shows the relationship of the various dimensions of the cone-sphere shape.

A sphere-cone type shield was selected due to its simplistic shape, historical analyses, and sensible application to a ballistic design. By varying the radius of the spherical nose and the half-angle of the cone, a wide range of heat shield shapes and aerodynamics could be generated. These were evaluated by a modified Newtonian hypersonic aerodynamic method. FIG. 3 shows the relationship between cone half angle, sphere radius and base diameter. FIG. 2 shows the resulting ballistic coefficients and Cm-alphas of the various shield-shapes assuming a constant crew capsule size and weight. A half-cone angle of 60 deg. and nose-radius-to-base-diameter ratio of 0.25 exhibited the desired characteristics. Since the heat shield utilized in the Viking Mars entry possessed the same nose dimension but a 70-deg half-cone angle, it was chosen for the return vehicle design. This provided an aerodynamic and aerothermodynamic data base from flight and wind tunnel analyses generated in the Viking program which are available from NASA's Langley Research Center.

Aerodynamics of the 70-deg half-angle cone with 0.25D nose radius were generated with the modified Newtonian theory. These are listed in Table 1 for a number of angles-of-attack and apply particularly to the hypersonic regime. The selected shape has a drag coefficient of 1.6 at the nominal 0-deg angle-of-attack. If desired, the vehicle could be flown with an intentional offset c.g. to produce lift. A 5-deg angle-of-attack would create an L/D of 0.08.

Figure 4:
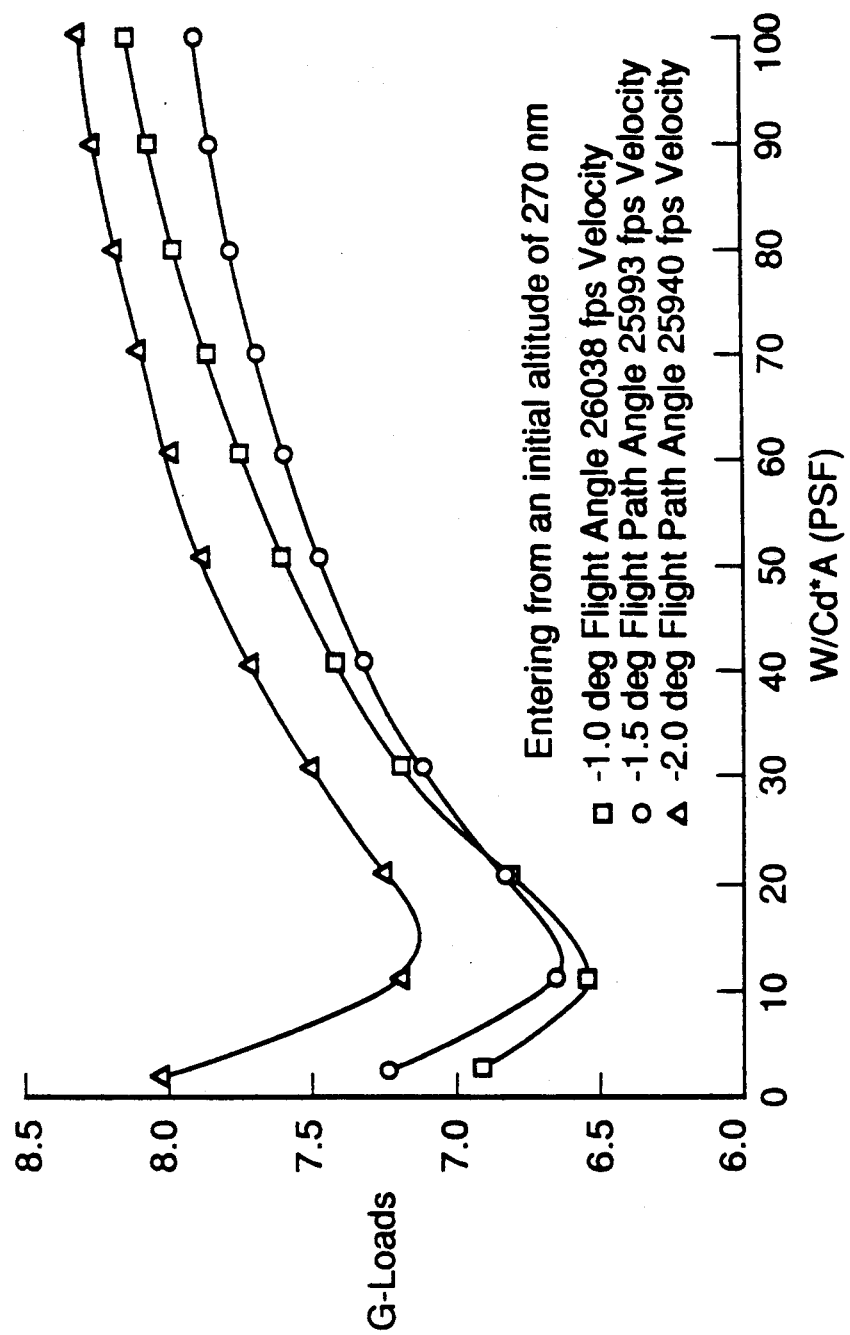
FIG. 4 is a graph showing the sensitivity of the maximum entry g-load for three reasonable entry flight path angles as a function of the vehicle ballistic coefficient.

FIG. 4 shows the sensitivity of the maximum entry g-load for three reasonable entry flight path angles as a function of the vehicle ballistic coefficient. Danger of skipout exists for entry flight path angles more shallow than −1.0 deg. while entries steeper than −2.0 deg. show unnecessarily large loads. Larger ballistic coefficients typically cause higher loads, although a minimum g-load is actually evident at about 13 pounds per square foot (psf). A ballistic coefficient of this magnitude is unreasonably low for a solid shell entry vehicle for this mission, so attempting to minimize the ballistic coefficient is the best design policy. Note that the Apollo shape with a ballistic coefficient of 36.8 psf provided the lowest entry g-load (7.25) of the three original configurations. The final return vehicle design achieved approximately the same load on entry since its ballistic coefficient was 37.2 psf. None of the entry cases shown is in danger of exceeding 3 g's for more than 5 minutes, thus meeting the physiological requirements.

Figure 5:
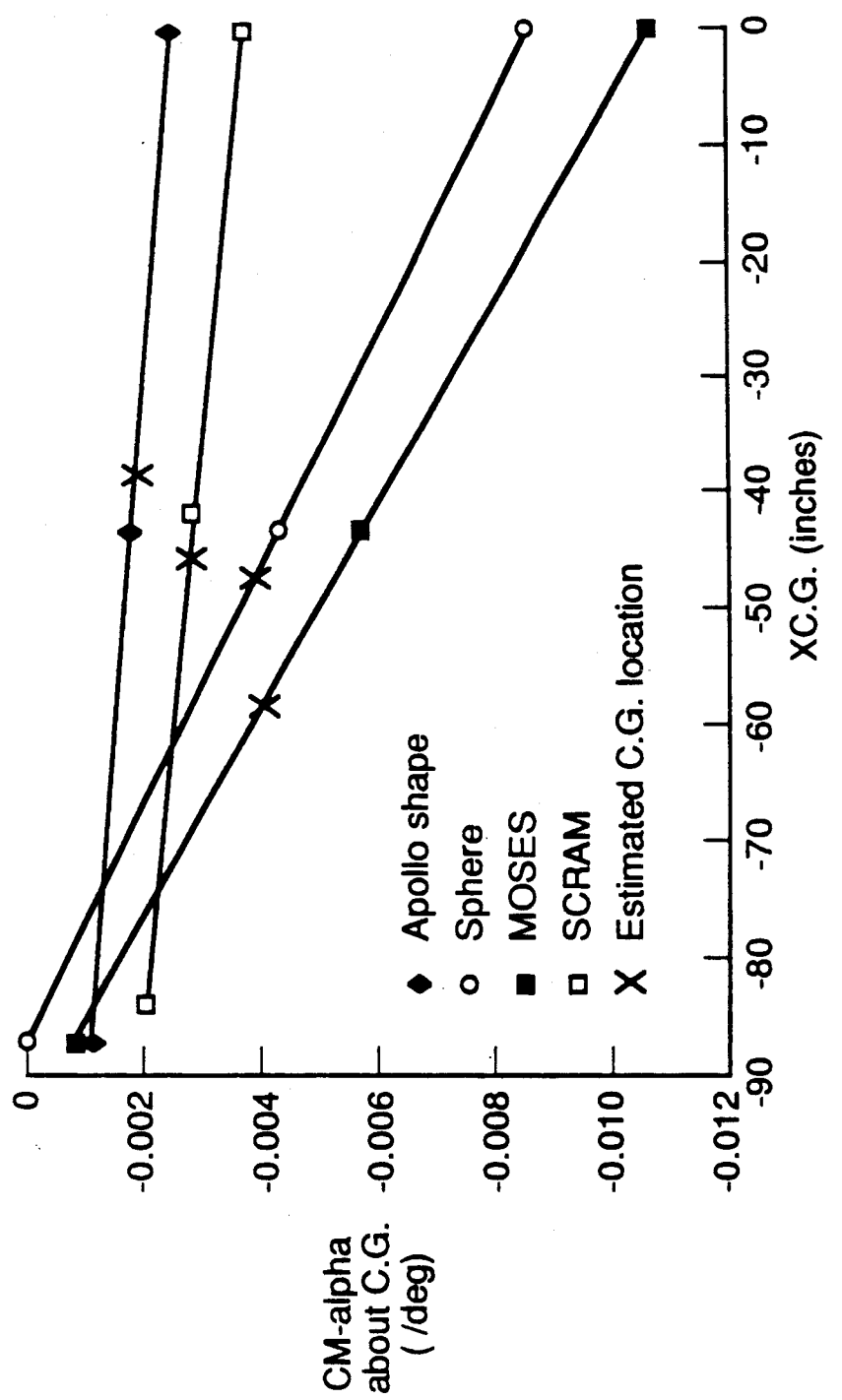
FIG. 5 is a graph showing the Cm-alphas of the three candidate configurations and the final return vehicle design.

The other aerodynamic consideration was the moment slope (Cm-alpha) which determines the aerodynamic stability of the vehicle. A negative Cm-alpha defines a statically stable vehicle in which restoring forces are generated if the angle-of-attack is disturbed away from zero (note that dynamic stability is not guaranteed). The more negative the Cm-alpha, the more statically stable the vehicle behaves. FIG. 5 shows the Cm-alphas of the three original candidates and the final return vehicle design. They are plotted as functions of the c.g. position from the nose of the vehicles (Xcg). In all cases, the closer the c.g. is to the nose, the more negative Cm-alpha becomes and the more stable the vehicle is.

TABLE 1

RETURN VEHICLE AERODYNAMICS -HYPERSONIC MODIFIED NEWTONIAN MODEL
($CpO = 1.83$)

| Alpha Beta | CD L/O | CL Cm | CA Ce | CY Cn | CN |
|---|---|---|---|---|---|
| 0.00 | 1.60947 | 0.00000 | 1.60947 | 0.00000 | 0.00000 |

TABLE 1-continued

RETURN VEHICLE AERODYNAMICS -HYPERSONIC MODIFIED NEWTONIAN MODEL
($CpO = 1.83$)

| Alpha Beta | CD L/O | CL Cm | CA Ce | CY Cn | CN |
|---|---|---|---|---|---|
| 0.00 | 0.00000 | 0.00000 | 0.00000 | 0.00000 | |
| 5.00 | 1.59356 | −0.12101 | 1.59803 | 0.00000 | 0.01834 |
| 0.00 | −0.07593 | −0.01886 | 0.00000 | 0.00000 | |
| 10.00 | 1.54663 | −0.23603 | 1.56412 | 0.00000 | 0.03613 |
| 0.00 | −0.15261 | −0.03715 | 0.00000 | 0.00000 | |
| 15.00 | 1.47099 | −0.33947 | 1.50873 | 0.00000 | 0.05281 |
| 0.00 | −0.23078 | −0.05431 | 0.00000 | 0.00000 | |
| 20.00 | 1.37032 | −0.42650 | 1.43355 | 0.00000 | 0.06790 |
| 0.00 | −0.31124 | −0.06981 | 0.00000 | 0.00000 | |
| 25.00 | 1.24944 | −0.49334 | 1.34087 | 0.00000 | 0.08092 |
| 0.00 | −0.39485 | −0.08320 | 0.00000 | 0.00000 | |
| 30.00 | 1.11399 | −0.53753 | 1.23351 | 0.00000 | 0.09148 |
| 0.00 | −0.48253 | −0.09406 | 0.00000 | 0.00000 | |

NOTE: Pitching moment (Cm) about nose stagnation point.

The calculated locations of the Xcg's for the respective vehicles are shown on their corresponding curves. Although the final return vehicle design did not achieve the stability of the MOSES or spherical designs, it is approximately 50 percent more stable than the Apollo design. The return vehicle c.g. was computed to be about 45 in. behind the nose at entry. The aerodynamic center was calculated to be approximately 170 in. behind the nose in the hypersonic regime.

Figure 6:
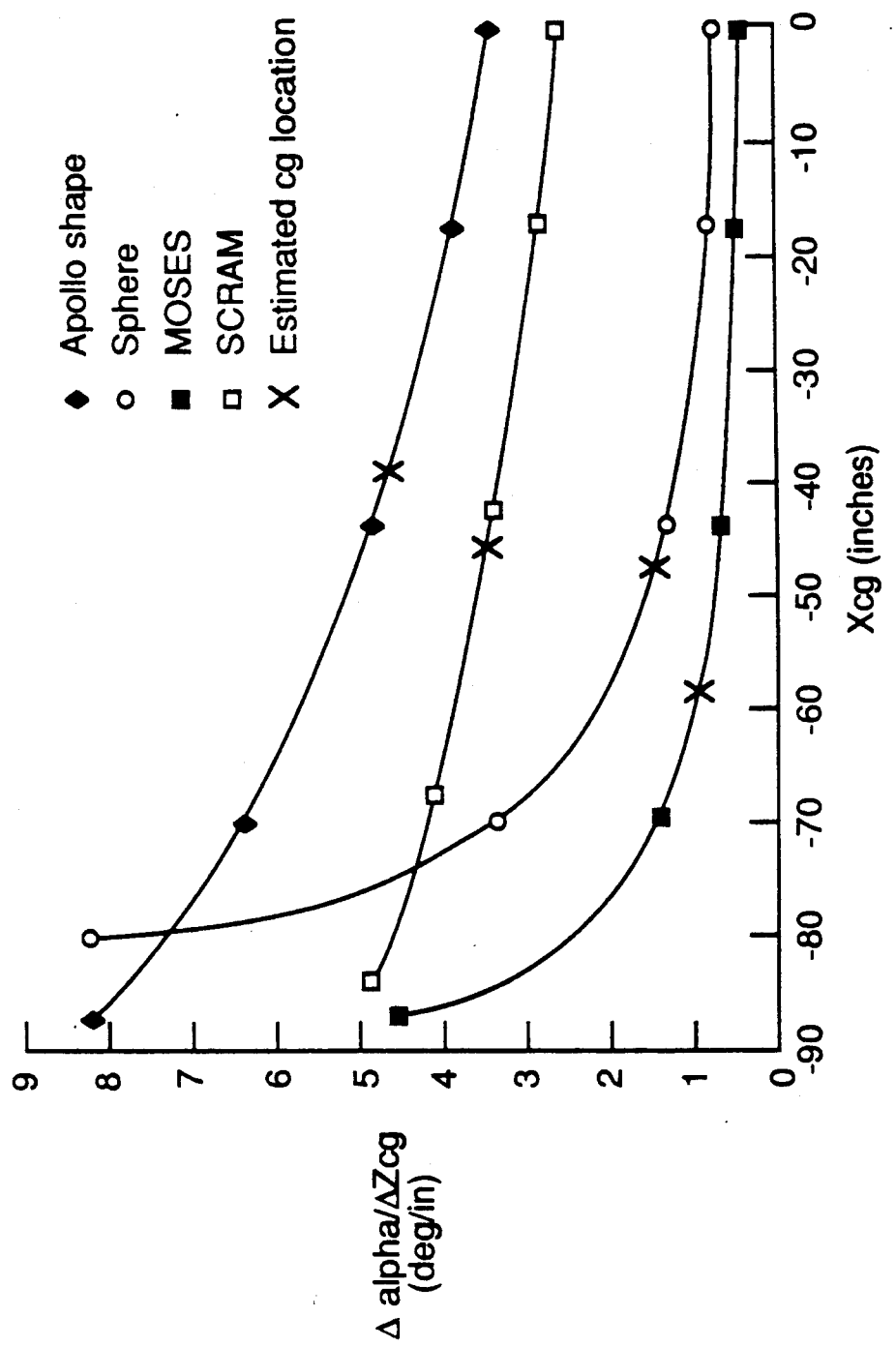
FIG. 6 is a graph showing the change in angle-of-attack due to a c.g. offset from the vehicle centerline.
Figure 7:
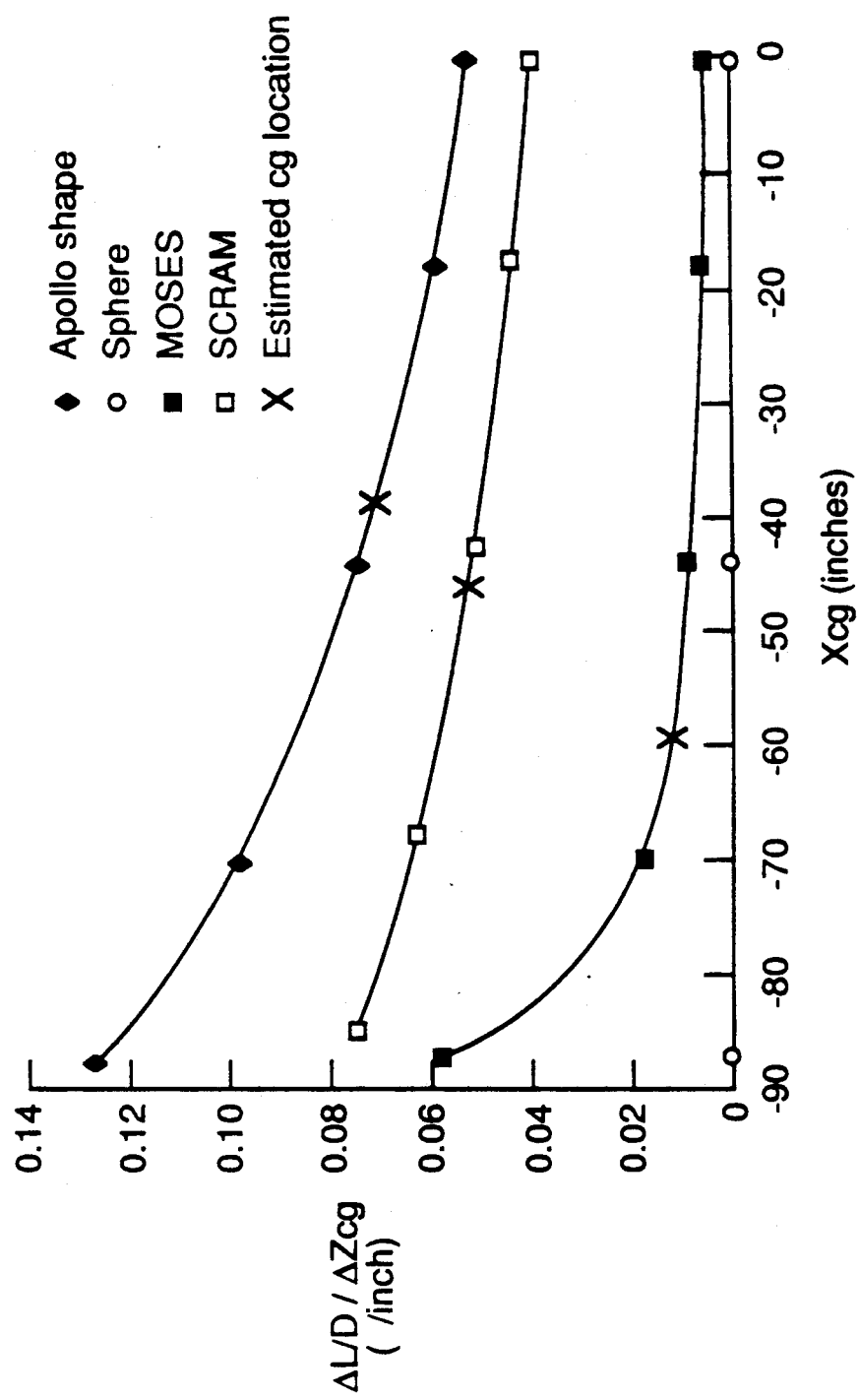
FIG. 7 is a graph showing the change in L/D due to a c.g. offset from the vehicle centerline.

The Cm-alpha moment slope of a configuration also determines the sensitivity to c.g. offsets from the centerline. FIGS. 6 and 7 present the change in angle-of-attack and L/D due to a c.g. offset from the vehicle centerline. Again these factors are functions of the Xcg location, and the respective vehicle design Xcg's are shown on their corresponding curves. The final return vehicle design with Viking-like heat shield exhibits a 3.5 deg. angle-of-attack change and 0.05 L/D change for every inch of c.g. offset from the centerline.

2. Guidance, Navigation, and Control (GN&C)

a. Guidance

The guidance aspects of the return vehicle mission are limited to the deorbit phase due to the ballistic entry rather than a lifting entry (see section 1.- Aerodynamics). The guidance logic during deorbit burn could be either open-loop or closed- loop. With an open-loop option, the burn duration would simply be for a fixed amount of time and could be accomplished by a solid rocket motor (SRM). The thrust direction would also be fixed. Calculation of the trajectory in real time before the burn would be required to determine when the burn should be initiated in order to hit a landing target. Dispersions due to navigation errors, impulse errors, ignition delays, or vehicle weight uncertainties would not be corrected, resulting in landing footprint expansion. This logic is most simplistic but would require a computer or trained astronaut with trajectory charts for the initial trajectory estimation and burn initiation calculation.

A closed-loop burn would entail calculations of trajectory during the burn with feedback to the burn control system. This feedback would control the thrust duration and/or direction guiding the trajectory to a target. Closed-loop guidance could reduce the landing footprint by approximately 30 percent but would increase the avionics and software complexity. Closed-loop logic also requires a liquid as opposed to a solid deorbit engine. Because a liquid engine was selected for other reasons (see section 7.- Propulsion) and closed-loop guidance was not a major impact to the vehicle software and avionics requirements, the closed-loop option was selected to aid in minimizing the landing footprint. With this option and a 1 revolution per minute (rpm) entry roll rate to null out c.g. dispersions, it is expected the vehicle can hit a predicted target within 33 miles.

b. Navigation

A wide variety of navigational techniques is available for use in an return vehicle mission. They range from crude horizon alignment window marks to ultra-sophisticated star trackers. Two parameters are required from a navigation system: state vector and attitude. The vehicle's state vector involves its position and velocity vectors, whereas attitude implies vehicle orientation. The state vector is required to be able to target to a landing site and the attitude must be known to direct the deorbit thrust vector.

Initial knowledge of attitude can be most simply acquired through horizon alignment with window marks or with a crew optical alignment sight (COAS). Although a local horizontal attitude can be easily achieved with these aids, aligning the vehicle with the velocity vector is a more difficult task. Manually, it would be a very time-consuming process and require a large training effort for all astronauts attending the Space Station Freedom. The process can be achieved much quicker through a gyrocompassing technique which requires attitude rate gyroscopes. This method and the use of manual devices were eliminated due to training and time requirements.

Automatic alternatives to attitude definition include horizon scanners and star trackers. Although these may be more time-efficient processors than their manual counterparts, they are expensive, complex active devices which tend to violate the basic philosophy of the return vehicle design. Likewise, initial knowledge of the vehicle state vector can be autonomously and automatically determined with a global positioning satellite (GPS) system receiver. Again, this is a costly and non-passive piece of equipment.

The only alternative method to state and attitude initialization is to receive this information from the Space Station Freedom before departure. An estimate of the handoff error in attitude was determined to be 0.35 deg. Estimates of a state vector handoff error have not been calculated, though they are expected to be insignificant due to the accurate nature of the GPS system receiver on the Space Station Freedom. The Space Station Freedom navigation systems are triply redundant, so the likelihood of all systems failing before return vehicle departure is remote. This initialization method was chosen for the return vehicle because of its simplicity, time effectiveness, and passivity.

Regardless of how the initial state and attitude of the return vehicle are determined, a method of maintaining knowledge of the trajectory and attitude is required, particularly during the deorbit burn which requires accurate thrust direction control. When eliminating a manual burn attitude control due to training impacts, a computer and inertial measurement unit (IMU) including gyros and accelerometers are required. Thus, the navigation system was selected to include a computer and IMU with initialization from the Space Station Freedom systems. No updates to the IMU are planned after departure from the Space Station Freedom; therefore, acquired navigation errors due to drift rates during the 3-hour mission time were accepted.

Two sets of navigation hardware were selected which utilize internal test equipment to shut down a failing unit. Note that the system is as basic as possible without involving a man-in-the-loop or requiring astronaut training. Table 2 presents the performance statistics of a candidate IMU for the return vehicle.

c. Control

A method of controlling the return vehicle is required for Space Station Freedom departure, deorbit burn attitude, and pre-entry attitude control. Momentum transfer devices were quickly analyzed for this task but exhibited large weight and power requirements. A tractor rocket concept was reviewed to provide the deorbit ideal velocity increment (delta-V) which would require no attitude control during the burn. However, no off-the-shelf SRM's of the desired impulse, thrust, and size could be found. Also the tractor rocket was difficult to integrate into the return vehicle when attached to the Space Station Freedom, and dynamic problems existed concerning the tractor line cut. In any case, another method of pre-burn and post-burn orientation would have been required in addition to the tractor rocket.

The most simplistic and common system, reaction control system (RCS) jets, could perform the required control via manual or automatic inputs. These were selected for the return vehicle design. Details of the RCS jets are provided in section 7.- Propulsion.

Functions of the control system include separation maneuvers from the Space Station Freedom and jettisoned propulsion module, maintaining attitude commanded by guidance in all flight phases, and providing a 1 rpm roll rate during entry.

TABLE 2

| HONEYWELL H700-3 LINS PERFORMANCE MODEL | |
|---|---|
| Gyro Error Sources | RMS Values |
| Gyro drift bias | 0.023 deg/hr |
| Gyro scale factor | 10 ppm |
| Gyro input-axis alignment | 6 arcsec |
| Gyro random walk | 0.015 deg2/hr |
| Accelerometer Error (Bell) | |
| Acc. bias | 6 ug |
| Acc. scale facto | 6 ppm |

3. Displays and Controls (D&C)

Two alternative methods for vehicle control were considered. The first method was to have manual controls with dedicated displays. Another option was to have automatic controls with a limited number of displays required for mission success and survival. The main drawback to a manual system is the crew proficiency training required for vehicle operation. The long duration on-orbit stay times of the crew would necessitate a simulator onboard the Space Station Freedom. Manual control also consumes valuable mission time and could result in undesirable attitudes or dynamics. Automatic control simply involves the connection of the already selected computer/IMU with the RCS (RCS jets plus jet drivers). It was decided to have an automatic control system with a manual override for non-critical systems. The system is designed for minimal crew interface and, therefore, no hand controllers are supplied for vehicle control.

a. Selected System Description

Control for the return vehicle during all flight phases will be performed automatically by the computer/IMU. After a manual command to release from the Space Station Freedom, the computer will initiate the RCS burn needed to maneuver away from the Space Station Freedom. The automatic control system will maintain vehicle attitude through deorbit burn and reentry. Vehicle thrust and accelerations will be monitored by the IMU, and the deorbit burn will be terminated automatically by the control system when the flight dynamic parameters are met.

The dedicated displays provided in the vehicle are limited to those required for mission success and survival. A multifunction display (cathode ray tube (CRT)) and keyboard combination is provided for the primary interface between the crew and the vehicle subsystems. The CRT's will be used to provide inputs to the computers, display subsystem information, and reconfigure the avionics system if necessary. Critical information that needs to be monitored immediately or at all times requires a dedicated display. The information provided by the dedicated display can also be accessed by the CRT, but the information might be too deeply nested and not available for immediate display. Thus, the CRT can be used as a backup for the dedicated displays.

A dedicated caution and warning (C&W) system including a master alarm and annunciator light matrix is provided along with a fire warning system. The other dedicated displays include: altimeter, RCS and deorbit propulsion meters, mission timer, environmental control and life support (ECLS) meters, power meter, and event indicators. Switches and circuit breakers are also provided for manual control of various subsystem functions (i.e., communications tone and volume). Weights and volumes have been included for the panels required to contain the D&C. A 3-string light assembly is provided for crew cabin illumination.

4. Communications

The only mission requirement for the communication subsystem is voice communication with the search and rescue team. An air/ground voice channel would be helpful but such a requirement did not exist. Requirements for telemetry, voice channel to the Space Station Freedom, and position information for the guidance, navigation, and control (GN&C) subsystem did not exist for the communications system either.

S-band communication was considered but was rejected due to several system limitations. The S-band system was not chosen because of complexity, weight, and power requirements of the available equipment. Also, development of new hardware would entail a costly development program. Finally, an ultrahigh frequency (UHF) system would be required in addition to the S-band system since an S-band link cannot be maintained after deorbit.

a. Selected System Description

The UHF system was selected and will be used primarily to communicate with the search and rescue team, but the system also offers minimal on-orbit communication coverage. Communication with the search and rescue team only requires a transceiver/antenna combination which can be a simple, lightweight, low-power system. Two transceivers are supplied to achieve redundancy, and a hand-held survival radio is provided in case the crew has to abandon the vehicle.

Providing an on-orbit capability to communicate on a UHF channel has many operational impacts associated with it. For the return vehicle to communicate with military satellites (e.g., LEASAT or FLTSAT) in geostationary orbits, a larger more powerful transceiver would be required. The weight and power requirements of this transceiver would be too high for return vehicle operations. Moreover, obtaining a dedicated channel on a military satellite will be politically difficult and, without a dedicated channel, other users with stronger signals will quickly drown out the weak signal from the return vehicle. Finally, the military satellites will be replaced with low Earth orbiting versions at the end of their operational lifetime. The LEO satellites will be much harder to communicate with due to short coverage periods. The UHF system proposed will broadcast to the ground on the 243 guard distress frequency. Any ground station around the world that receives this frequency can communicate with the vehicle. Communication on-orbit and postlanding is limited to line-of-sight coverage.

5. Environmental Control and Life Support (ECLS)

The return vehicle design philosophy of having a simple passive vehicle when applied to the ECLSS has a major impact on mission duration and vehicle size. Three hours is the limit of the passive system considered with longer duration missions dictating an active system. This limit is due to crew metabolic and electronic heating within the crew compartment. Due to the complexity, an effort was made to avoid using an active ECLS. Advantages and disadvantages between active and passive systems were weighed to select the proper system for the vehicle.

a. Active Coolant Loop/Ambient Air:

An ECLSS using an active thermal control system and ambient air bled from a tank with carbon dioxide ($CO_2$) reduction for life support was considered a viable possibility. The active thermal control system which utilized a water coolant loop and coldplate cooling was not desirable from a reliability and maintainability standpoint. High weight and power requirements were considered to be other drawbacks of an active system. Since the return vehicle is to be available for immediate use after an Space Station Freedom catastrophic failure, the condition of the Space Station Freedom atmosphere must be considered when deciding on the life support system for the return vehicle. The atmosphere within the crew cabin might be filled with smoke or toxic fumes so, if no means of removing the bad atmosphere is provided, the vehicle will be unusable. In this situation, it is desirable for the crew to be able to don a supplementary breathing apparatus once inside the cabin. The ambient air within the cabin must be conditioned with lithium hydroxide (LiOH) to reduce the $CO_2$ buildup during a normal mission. Providing a $CO_2$-controlled environment requires LiOH canisters and circulation fans which add weight and power requirements.

b. No Thermal Control/Cabin Air Only:

The feasibility of not having an ECLSS was considered for the return vehicle. In theory, if the crew cabin volume was large enough, a short-duration mission could be survived without any life support or cooling equipment. However, this volume was much too excessive for a reentry vehicle. The $CO_2$ buildup in the cabin atmosphere becomes significant fairly quickly, and the heat generated by the crew and electronics must be controlled In some manner. This ECLS concept was not pursued further.

c. Passive Thermal Control/Bottled Air:

This ECLS option was selected for the return vehicle because it was the least complex and most reliable and maintainable system. The thermal environment is controlled passively by wax which absorbs heat by changing phases. Two different types of wax would be used: one for cooling the electronics, the other for the crew. The wax used for the electronics would be n-octadecane which has a melting point of 82 Fahrenheit (F.). This wax will surround the avionics within thin layers of plastic. It will remain in a solid state until the temperature within the cabin rises above the melting point, at which time it liquefies. The wax used to control crew metabolic heating, n-hexadecane, has a 64° F. melting point. This wax is incorporated into garments (i.e., blankets or vests) that the crew would use while in their seats. The temperature within the return vehicle needs to be maintained below the melting points of the waxes during the quiescent phase to ensure system effectiveness. This can be accomplished with proper coatings and insulation on the exterior of the vehicle. Also, cold air from an Space Station thermal duct will be circulated within the cabin by a fan and duct located within the berthing ring.

Launch escape helmets (LEH's) will be used for crew breathing. The LEH's will be connected to an air tank and each crewmember can regulate his air intake by a flow control valve. Enough air is provided for a crew of six for over 3 hours. The crew will use LEH's throughout the flight and for a short period postlanding to avoid breathing the CO2-concentrated atmosphere within the cabin. Postlanding vents and fans will be used to dissipate CO2-concentrated pockets within the cabin. Using LEH's eliminates the need for a CO2-controlled atmosphere and provides a safe air supply in the event toxic air might be in the cabin upon return vehicle initiation.

The ECLSS will include other equipment in addition to the wax, air, LEH's, and postlanding fans and ducts mentioned above. Pressure within the cabin will increase since the crew is breathing through the LEH's and exhaling into the cabin. A cabin pressure relief valve is needed to keep the pressure within the cabin from rising above a certain level. A fire extinguisher is provided for contingency use. Sensors for cabin temperature and pressure are available for crew monitoring. Crew consumables include potable water and waste management bags.

The weight of this passive ECLSS is 463 lb and only requires 34 watts (4) of power postlanding. This system is simple, reliable, and passive, and requires low power while ensuring a non-contaminated air supply. The wax thermal control system is a new technology and will have some development costs associated with it, but the overall cost of this passive system should be substantially lower than that of an active system.

6. Electrical Power

Several power system options were considered during the return vehicle design process to determine which type of system was best suited for the vehicle in terms of weight, volume, complexity, and cost. The first step in this process was to develop a power and energy profile throughout all mission phases. Four mission phases were defined and power requirements for each phase were determined. Power requirements of each subsystem were developed for this purpose. The four mission phases were: 106 minutes on-orbit, 11 minutes deorbit burn, 47 minutes entry, and 48 hours postlanding. Table 3 lists the power requirements broken down by time phase and power level. The results of the power profile show that a total energy requirement of 7392 watt-hours (wh) is needed. In addition, a peak power level of 1883 watts must be met by the power system.

TABLE 3

| POWER/ENERGY PROFILE Power/Energy Requirements | | | | |
|---|---|---|---|---|
| System | On-orbit 106 min | Entry Burn 11 min | Entry 47 min | Recovery 48 hr |
| Avionics | 547 w | 567 w | 547 w | 30 w |
| D&C | 792 w | 792 w | 792 w | 5 w |
| C&T | 23 w | — | 23 w | 5 w |
| Propulsion | 8 w | 524 w | — | — |
| ECLS | — | — | — | 34 w |
| Power | 1374 w | 1883 w | 1362 w | 74 w |
| Energy | 2427 wh | 345 wh | 1067 wh | 3552 wh |
| Total energy = 7,392 wh | | | | |

A "fail-operational" requirement was also imposed on the power system which will increase the total energy requirement. Finally, since the vehicle would have fairly high power requirements throughout a short mission time, a battery system with a high output rate was needed.

Three lithium battery systems were considered along with a nickel-hydrogen (Ni-H2) system. The lithium systems were of lithium-thionyl chloride (Li-SOCl2) composition, two of which are active systems while the third is a reserve system.

The following power system options were considered.

a. Lithium-bromine complex (Li-BCX) DD-cell:

The Li-BCX system combines a bromine chloride additive with the basic Li-SOCl2 composition. This cell had the highest energy density of the systems considered (125 wh/lb) which resulted in the lowest system weight. However, the nominal output rate of the system was too low for a 3-hour mission, which would cause the battery to vent its toxic and corrosive electrolyte or explode.

b. Jet propulsion Laboratory (JPL) Li-SOCl2 D-cell:

This cell has been developed to a prototype level by the JPL, but more extensive development and qualification testing is needed. This system has a higher rate capability than the Li-BCX cells, satisfying the need for a high-rate cell. The energy density of the cell at 100 wh/lb is lower than the Li-BCX. The disadvantages of this type of cell are that it has a limited storage life and also may require coldplate cooling to 0° F.

c. The Ni-H2 cell:

This cell has been baselined for use on the Space Station which gives it an advantage in commonality and also eliminates the development and qualification costs seen by the return vehicle program. However, when compared to the other systems, the energy density (17 Wh/lb) and volumetric density (39 lb/ft3) are too low. This system would also require thermal protection if located outside of the pressurized vessel. This type of cell has the needed high output rate, and the storage life can be maintained indefinitely by charging the system from Space Station power periodically.

d. The Reserve large Li-SOCl2 cell was selected.

The major difference between this cell and the other Li-SOC12 cells considered is in the way the electrolyte is stored. The electrolyte is stored separately from the rest of the cell until the battery is activated. Once the battery is needed, the electrolyte is removed from its storage tank and is added to the cells. The advantage of a reserve system of this type is that it has a long inactive storage life with no degradation margin. However, one drawback of the system is that, once activated, the battery cannot be shut down unless the electrolyte is removed which might be impractical. The disadvantages of a reserve system are storage volume and maintainability assurance. Since the electrolyte is stored in a separate tank, the battery storage volume is almost double that required for an active system. The battery cannot be monitored for sufficient charge capacity until the system is activated.

The reserve large Li-SOCl2 cell battery system was chosen for the electrical power system for several reasons. First, the energy density of the system Is high (83 Wh/lb) as is the volumetric density (66 lb/ft3). The Li-BCX DD-cell had higher density numbers but did not provide the high output rate that the reserve system could. The Ni-H2 system provided the output rate required but weighed five times as much and required over nine times the storage volume. Also, the reserve system provided a long inactive storage life with no degradation margin and no safety concerns related to storage. Finally, the system does not require periodic charging from the Space Station or special thermal requirements such as coldplate cooling.

The system consists of eleven 9-cell modules connected in parallel, each projected to deliver 25 ampere hours (ah) at a nominal 30 volts (v). The 11 modules provide 8415 wh of energy which in turn provides enough additional energy to accommodate a 1-module failure. The battery has a weight of 101 lb and a volume of 1.5 ft3. Power is available only upon activation; therefore, periodic maintenance checks of return vehicle subsystems must be performed under Space Station power. Once the system is activated, the vehicle must be used or the power system must be replaced. Precautions must be taken to ensure that the battery is not activated unintentionally.

7. Propulsion

Several propulsion system combinations were considered during the design phase of both the RCS and the deorbit propulsion system. Solid, liquid, and cold gas systems were considered as well as combinations of these systems. For entry purposes, it is desirable to jettison the deorbit system in an effort to lower the weight which results in a lower g-loading. The RCS is needed for Space Station proximity operations, during the deorbit burn, and throughout atmospheric entry and, thus, cannot be jettisoned.

A ground rule used in propulsion system design was to use available technology and hardware. This constraint was placed on the design since the development of a new propulsion system would require a large qualification program which would be very costly and might also introduce delays in the program.

a. Solid Main/cold Gas RCS:

A literature search was made to find an existing solid rocket engine that had the required impulse for the deorbit burn. The thrust level also had to be considered since a c.g. offset or thrust misalignment would have to be controlled by the RCS. A liquid RCS in conjunction with the solid main was not considered due to the complexity and the fact that a hazardous fuel would be onboard after landing. Therefore, a cold gas system was chosen as the RCS candidate for a solid main. The available cold gas systems considered employed 5-lb thrusters. The maximum main engine thrust level that could be controlled by the cold gas RCS with a 32.5 ft-lb control moment and a 1-in. c.g. offset is 400 lb. Therefore, the main engine needed relatively low thrust and a long duration burn to meet the impulse requirement. The available solid motors with the required total impulse all had high thrust and short duration burns. A solid main/cold gas RCS could not be designed with adequate control authority.

b. Liquid Main/Liquid RCS:

A liquid main propulsion system in conjunction with a liquid RCS was considered along with an integrated main/RCS liquid system. Hydrazine propellant was chosen since long on-orbit stay times dictated a storable system. The benefit of an integrated system was that the same motors could be used for control and deorbit. The drawback was that the system could not be jettisoned. The non-integrated system permitted a service module-type arrangement that could be released before entry, but the problem of landing with dangerous a propellant was not alleviated. The Space Station plume impingement was also a concern with a liquid RCS.

c. The Liquid Main/Cold Gas RCS system was selected.

A liquid main system combined with a cold gas RCS constitutes the return vehicle propulsion. This combination was chosen for several of the reasons mentioned above. First, deorbit propulsion could be located in a separate module and could be jettisoned before reentry, alleviating the problem of recovering the vehicle with hazardous propellants. Second, the total impulse and thrust level requirements could be matched using existing hardware. Third, the cold gas RCS is a simple system that provides adequate control authority and does not pose plume contamination problems.

Figure 8:
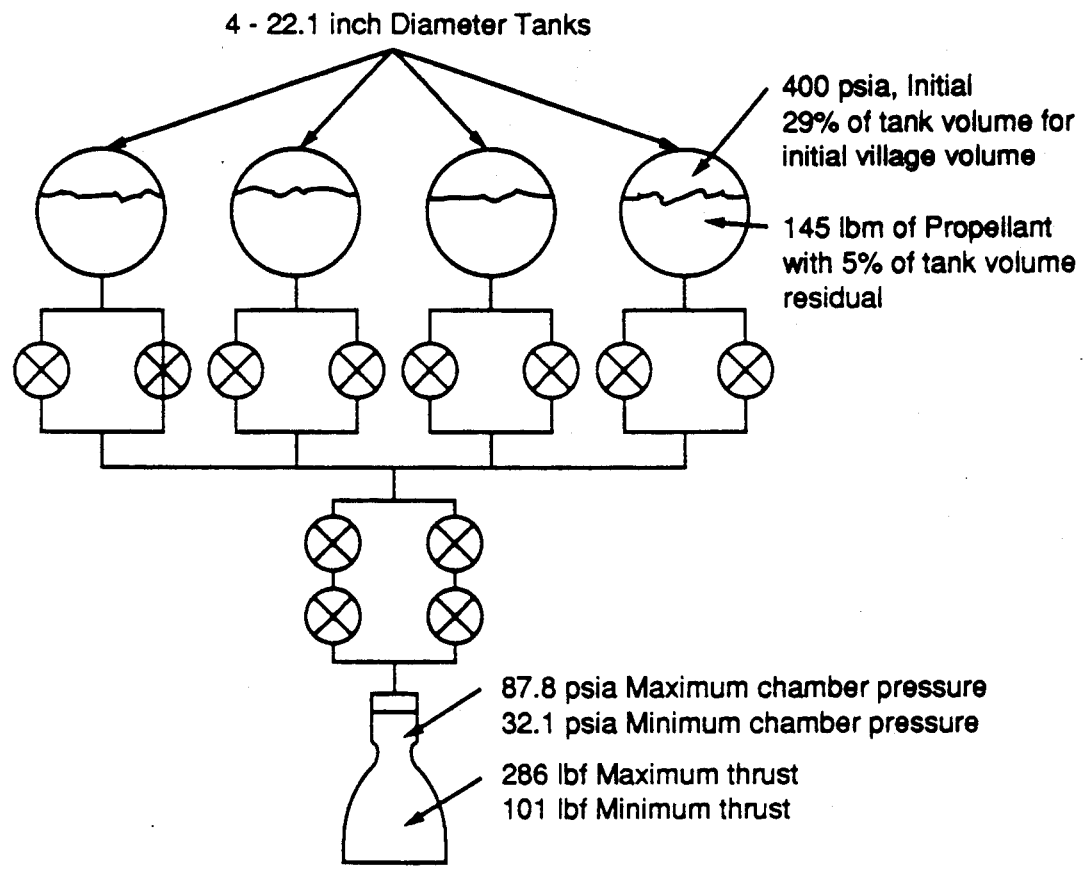
FIG. 8 is a schematic of the monopropellant blowdown system selected for the return vehicle.

Details of the Liquid Main system. A monopropellant blowdown system was selected for deorbit propulsion. The system is shown schematically in FIG. 8 along with the major parameters related to system sizing. The propellant subsystem includes propellant tanks, delivery lines, and dual isolation valves in each line. Major sizing parameters for the propellant subsystem are the number of tanks, tank volume, residual propellant volume, Initial ullage pressure, and Initial ullage volume. The engine subsystem includes isolation valves, a thrust chamber, and a nozzle extension. Major sizing parameters for the engine subsystem are the initial and final chamber pressures. Sizing of the propulsion system also depends on two performance parameters: system weight and delta-V capability.

The engine selected burns hydrazine and has been used for spacecraft orbit adjustment. It was manufactured by Walter Kidde & Co., Inc. for the Lockheed Missiles and Space Co. The engine system includes a gimbal mount with a +−6 deg vectoring capability, venturi flow control, a solenoid quad valve, injector manifold heaters, chamber pressure transducers and thermocouples, a catalyst bed of Shell 405, and an 88-to-1 expansion ratio nozzle. The engine will be hard mounted after the gimbal mount is removed since the RCS provides enough control authority and thrust vector control would only complicate the control algorithm. Table 4 lists pertinent engine design and performance data.

The system sizing process was based upon a number of functional relations. For the tank, the ullage was assumed to decompress isentropically; the volume of the tank was equal to the sum of ullage gas, usable propellant, and residual propellant volumes. Tank weight was determined with an empirical relation based on the existing hydrazine tanks. Flow within the delivery lines and valves was modeled with the Darcy equation using a turbulent friction factor.

TABLE 4
ENGINE DESIGN AND PERFORMANCE DATA
PRINCIPAL DATA

| | |
|---|---|
| Overall engine length | 89.7 cm (35.3 in.) max. |
| Overall diameter | 45.7 cm (18.0 in.) max. |
| Engine life (total impulse) | |
| Specified | 3,380,480 N-s (760000 lbf-sec) |
| Demonstrated | 10,230,400 Ks (2,300,000 lbf-sec) |
| Limit | Not established |
| Storage life | In excess of 5 years, limit unknown |
| Weights | |
| Overall engine | 30 kg (66 lbm) |
| Thrust chamber, including heaters and Instrumentation | 19 kg (41 lbm) |
| Quad valve, including heaters | 8 kg (17 lbm) |
| Mount, including gimbal | 2 kg (5 lbm) |
| Inlet, Including cavitating venturi | 1 kg (3 lbm) |
| Propellant | N2H4, Hydrazine |
| Milspec | MIL-P-26536 |

PERFORMANCE

Thrust @ 10-5 Torr
616 N (138.5 lbf) min. @ 690 kPa (100 psia) feed pressure
1047 N (235.5 lbf) min. @ 1972 kPa (286 psia) feed pressure
1245 N (280.0 lbf) max. @ 2137 kPa (310 psia) feed pressure Isp

| | |
|---|---|
| Specified steady state | 228.3 sec Min. |
| Demonstrated @ 20 sec | 237.1 sec Max. |
| Demonstrated @ steady state | 243.3 sec Max. |
| Variable thrust, with propellant pressure only | |
| Demonstrated range | 445 N (100 lbf) to 1334 N (300 lbf) |

Performance, typical (see table 1)

These lines and valves were assumed to weigh 15 lbm. The flow and chamber pressure within the engine were required to satisfy a choked nozzle condition. Engine specific impulse (Isp) was determined with a characteristic velocity and thrust coefficient which depended (empirically) on chamber pressure. Finally, the ideal delta-V depended on all of the above parameters and required numerical integration due to the variable thrust during blowdown.

For sizing, the residual propellant volume, number of tanks, ideal delta-V, maximum chamber pressure, and minimum chamber pressure were specified. Primary unknowns included initial ullage pressure, initial ullage volume, tank volume, and propulsion system mass. Three sizing trade-offs were conducted to determine the combination of specified parameters which minimized propulsion system mass. In all cases, the Ideal delta-V was 425 feet per second (fps) (415+ −2.4 percent performance reserve), and the residual propellant volume was 5 percent of the tank volume.

Figure 9:
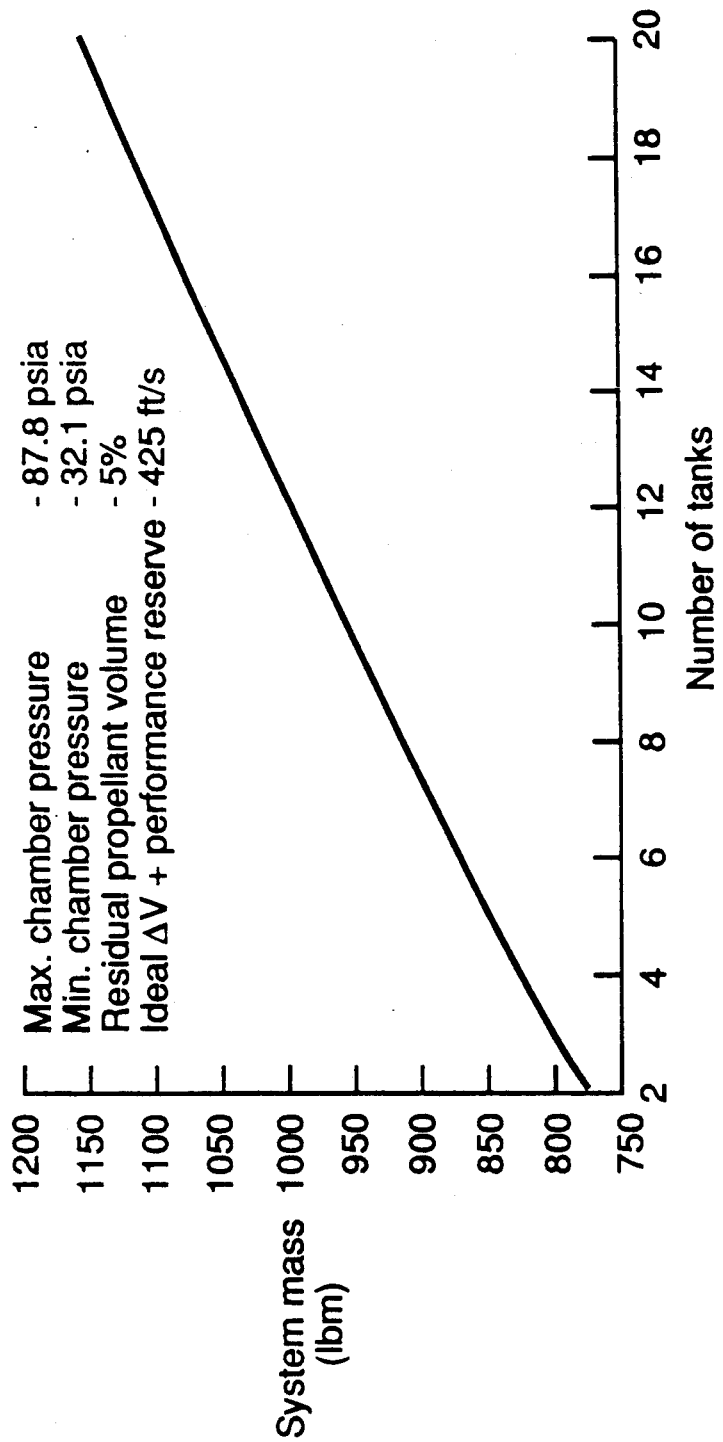
FIG. 9 is a graph showing the propulsion system mass versus the number of tanks.

In the first trade-off, chamber pressures were held at the maximum and minimum rated values while the number of tanks was varied from 2 to 20. The results, shown in FIG. 9, indicate that the minimum number of tanks results in the minimum weight. For the return vehicle four tanks resulted in the best compromise between system weight, tank layout geometry, and available tank designs.

Figure 10:
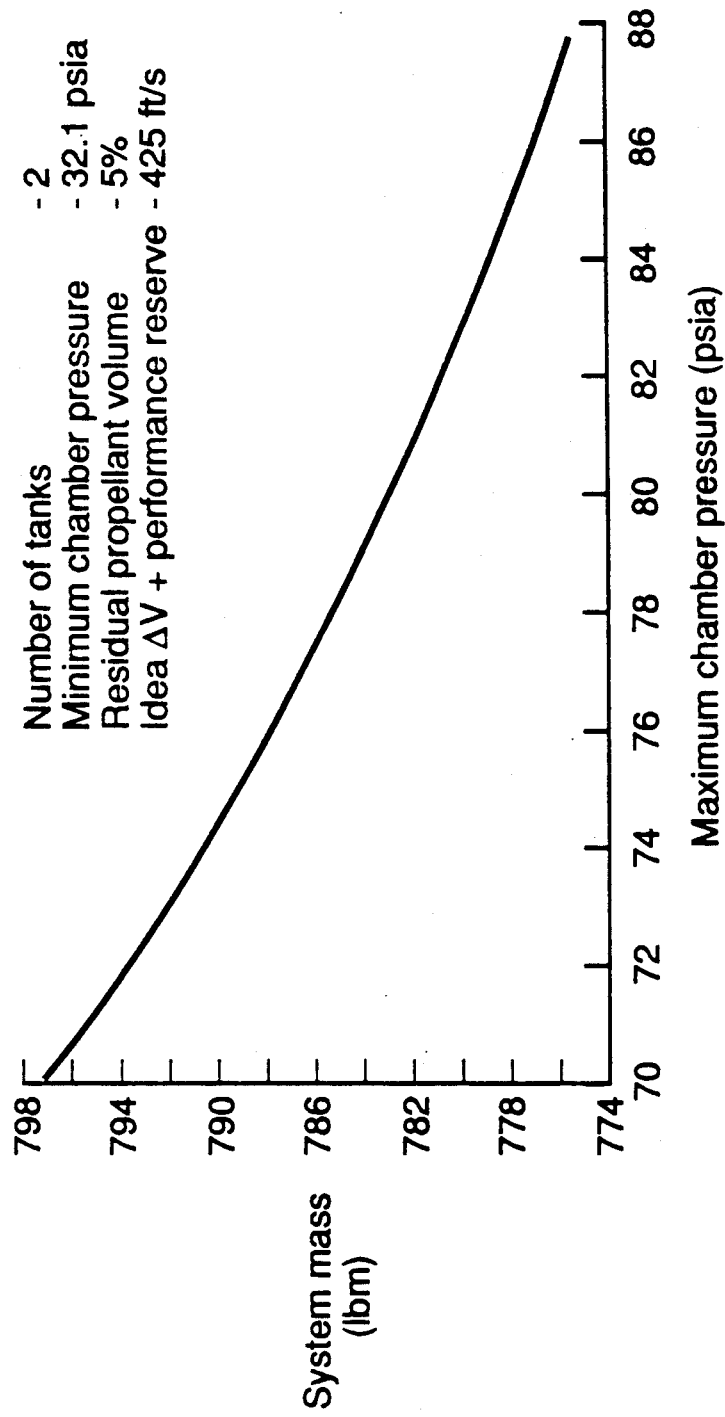
FIG. 10 is a graph showing the propulsion system mass versus maximum chamber pressure.
Figure 11:
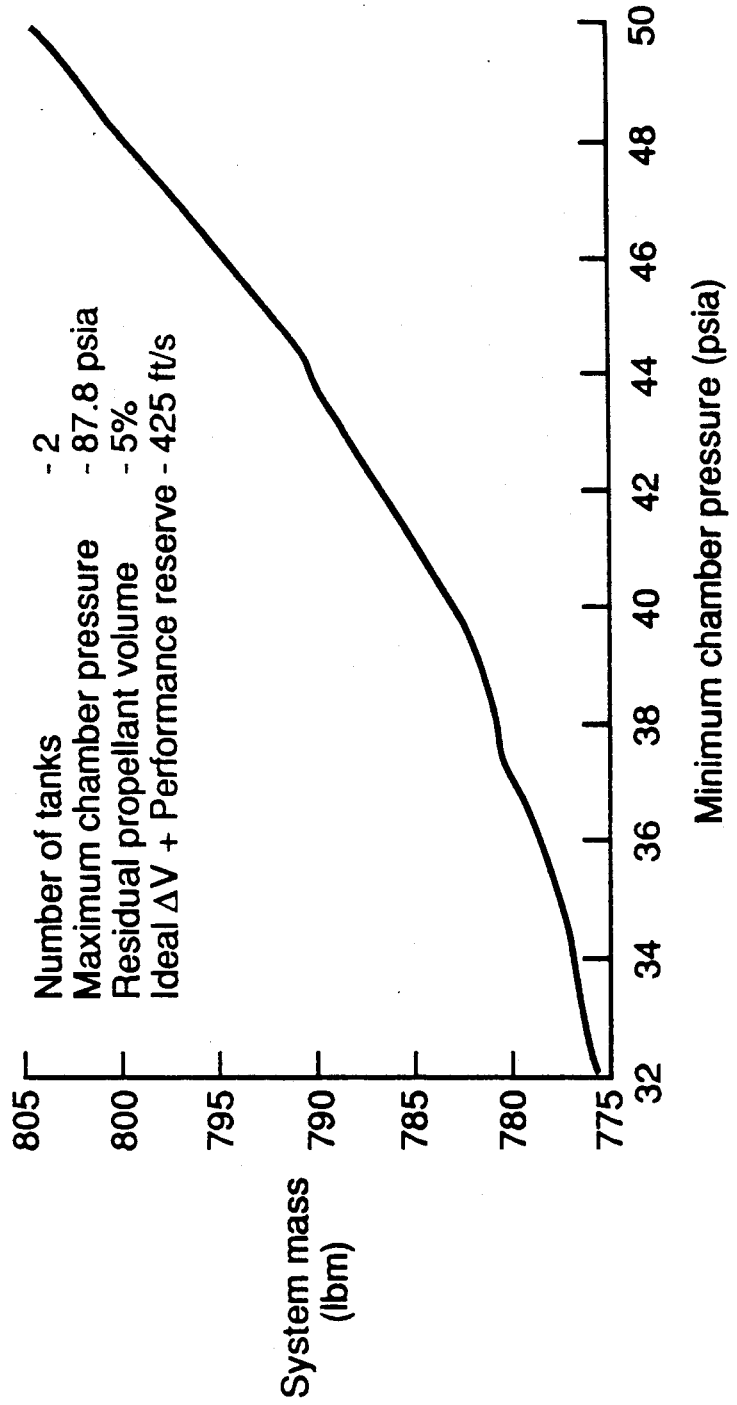
FIG. 11 is a graph showing the propulsion system mass versus minimum chamber pressure.

In the second trade-off, the number of tanks was held constant while the maximum and minimum chamber pressures were varied off of their respective limits. Results are shown in FIGS. 10 and 11 and indicate that use of the limits minimizes system weight. These limits represent the maximum total impulse available during blowdown operation given the required engine inlet conditions. The limits also correspond to flow rates which are within the rated range for this engine.

The third trade-off compared nitrogen and helium ullage pressurants for the 2-tank case using the rated chamber pressure limits of 87.8 and 32.1 pounds per square inch absolute (psia). Helium resulted in a 10 lbm increase in system weight over nitrogen; helium is also more rare (of greater expense) than nitrogen. For these reasons, nitrogen was selected as the ullage pressurant.

Tanks were selected with an "off-the-shelf" philosophy to keep costs to a minimum. Tanks with a 28-in. diameter (2-tank system) and a 22.1-in. diameter (4-tank system) were considered. In these categories, the most current models were a 22.1-in. Atlas-Centaur tank and a 28-in. Space Shuttle auxiliary power unit (APU) tank; both use a diaphragm for propellant expulsion. The rated operating pressure of the Atlas-Centaur tank is 485 psia while the rated pressure for the Space Shuttle APU tank is roughly 355 psia. Optimal initial ullage pressures for the 2- and 4-tank systems were determined to be 414 and 400 psia, respectively. This leads to a selection of the 22.1-in. Atlas-Centaur tank as the better option.

Details of the Cold Gas RCS. A cold gas RCS was selected due to Space Station plume impingement and recovery considerations. The cold gas system provided enough control authority for the selected hydrazine deorbit propulsion system. The RCS is separate from the deorbit system and stays with the vehicle during all flight phases. Located above the heat shield, the RCS is configured to provide the initial translational velocity required for Space Station separation. Eight aft firing thrusters provide control in yaw and pitch while four jets deliver roll control. The eight aft firing thrusters, divided into four dual-jet clusters, are located 6.5 ft from the vehicle axis of symmetry and are spaced 90 deg apart from each other. Two jets fire in the -Z direction providing a pure couple for roll control as well as translational capability.

Figure 12:
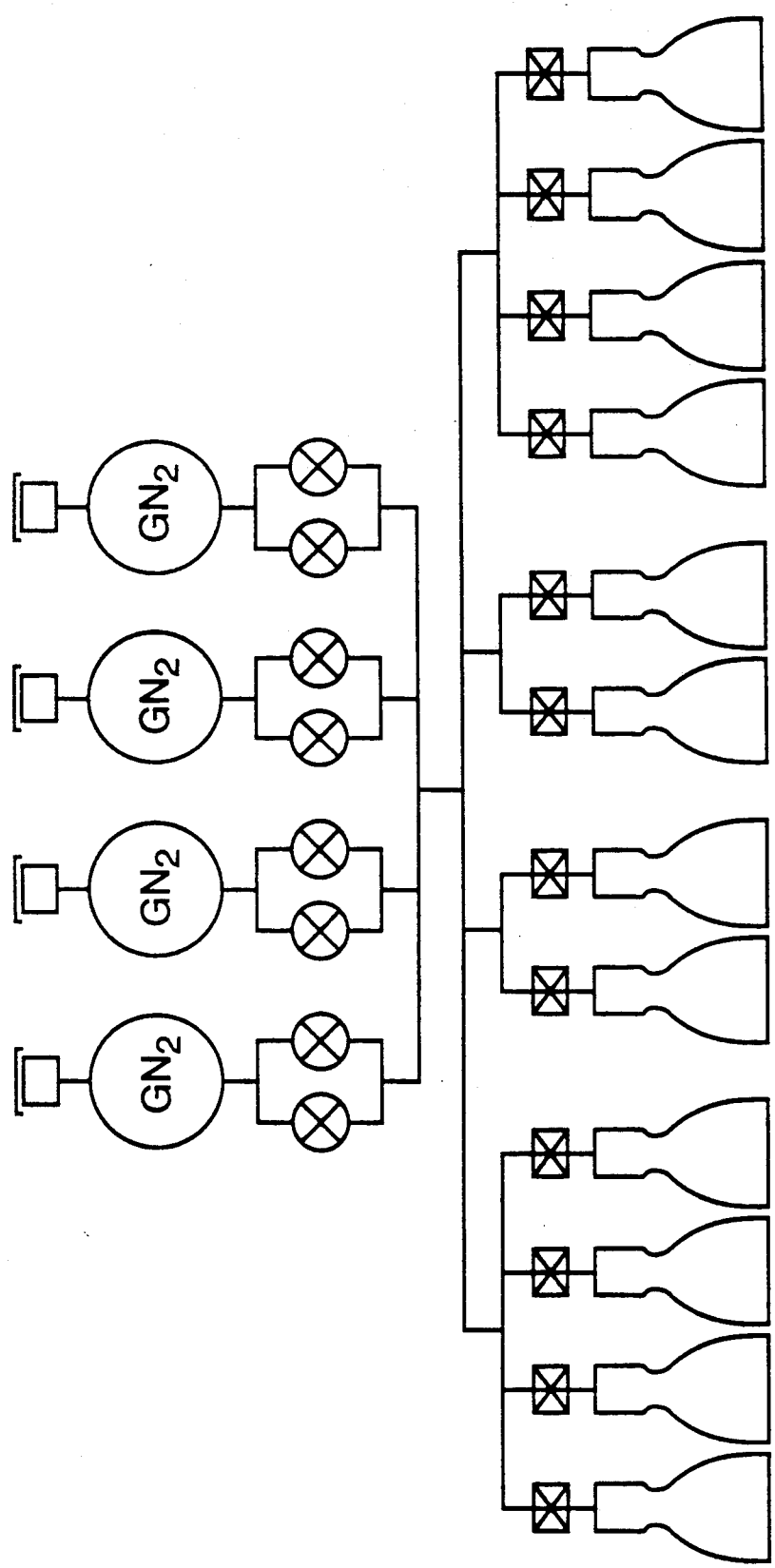
FIG. 12 is a schematic of the reaction control system.

In determining the propellant requirement for the cold gas RCS, a 100 percent duty cycle for one Jet was used during the deorbit burn with an additional 3-minute duty for Space Station proximity operations and entry adjustments. The burn time for the deorbit engine was calculated to be just over 11 minutes resulting In a 15-minute duty cycle for one Jet. For a thrust level of 5 lb and an Isp of 65 seconds, 68 lb of usable propellant are required. Fifteen percent of the usable propellant load was used for reserves and residuals resulting in a total propellant load of 80 lb of gaseous nitrogen (GN2). The GN2 is stored at 3600 psi in four 15.5-in. diameter tanks located between the crew compartment and the heat shield. The pressure received from the tanks is regulated to the operating pressure of the thrusters. The weight of the RCS including tanks, engines, regulators, valves, disconnects, and feed lines is 270 lb. The total RCS weight Is 350 lb. An RCS schematic is shown in FIG. 12.

8. Thermal protection

The thermal protection system (TPS) for the return vehicle was selected based on the expected heating environment witnessed in trajectory simulations. A nominal atmospheric entry velocity of approximately 26,000 fps and flight path angle of −1.3 deg produced a maximum stagnation point convective heating rate of 61 British thermal units (Btu)/ft2/sec. This was based on a fully catalytic cold wall assumption, a nose radius of 3.5 ft, and the Detra, Kemp, and Riddell correlation formula for a blunt body of revolution in hypersonic flow. The corresponding radiation equilibrium temperature of the stagnation point was a maximum of 3050° F. These values of heating rate and temperature would be slightly less if actual wall catalycity and non-equilibrium, considerations were taken into account. Therefore, the current best estimated peak temperature on the vehicle is expected to be approximately 2800° F. The temperature will also decrease with distance away from the stagnation point on the conical parts of the shield.

Only two TPS options were seriously considered due to their flight verification: ablative coating and Space Shuttle tiles. Although the ablative material could easily handle the heating environment, it is a heavy option and requires analysis to verify its long-term capability in a space environment. Micrometeorite impacts should be insignificant. A coating may be required for long-term exposure protection from ultraviolet radiation, thermal "baking out" of volatile substances, and oxidation on the surface. All of these factors tend to degrade the ablative material with uncertain effects on the entry performance. Outgassing of organic substances would create a hazardous and undesirable environment for the Space Station. A coating, if required, would need to be porous to allow the ablative material to breathe on ascent for pressure equalization, but then volatiles expulsion may be a problem on-orbit.

Orbiter LI-2200 tiles have a current approximate temperature limit of 3000° F. for one-time usage which would also handle the heating environment. The on-orbit lifetime of these tiles with their current glass coating is expected to be in excess of 4 years with exposure to atomic oxygen, ultra-violet radiation, and micrometeorites. Protection of the strain isolation pad which may be used in mounting the tiles to the surface is a major concern. Contaminates from Space Station outgassing and atomic oxygen can easily degrade the felt pad. Use of tile gap fillers would be imperative for protection.

Because of the longevity factor in space and the current production and availability of the Orbiter tiles, LI-2200 was selected for the return vehicle. The final system design utilizes 751 lb of LI-2200 tiles covering 165 square feet at a thickness that varies from 4 in. at the stagnation point to 3 in. at the heat shield maximum diameter.

In addition to the heat shield TPS, possible flow impingement on the aft portion of the crew compartment may require a row of tiles in this region. Computational fluid dynamics (CFD) analysis indicates that the heating rate in this area is 20 percent of the stagnation heating rate. This results in maximum temperatures in the range of 2000° F.

9. Landing and Recovery a. Parachute System

The return vehicle will use the baseline Apollo parachute system for landing. This system was sized for the Apollo reentry module which weighed over 13,000 lb on entry. The return vehicle which weighs under 10,000 lb, will descend slower than Apollo and, therefore, will have lower impact attenuation requirements. The Apollo system used several ground rules and design criteria to obtain a highly reliable system that would have a high-probability figure for mission success. Water landing was the primary landing mode, but land landing is a possibility and should not cause major injury to the crew. The landing system consists of two drogue parachutes and three main parachutes, all of which are intended to be utilized although the system can perform adequately with loss of one drogue and/or one main parachute. The probability of double failures is below the reliability threshold level. All parachutes are actively deployed independently of each other. The components that control the active functions are designed for prevention of non-functioning and premature functioning.

The parachute system consists of one 7.2-ft diameter chute used for cover ejection, two 16.5-ft diameter drogue chutes, three 7.2-ft diameter plot chutes, three 83.5-ft diameter main chutes, and the associated mortars used for chute ejection. The total weight for the system including mortars, risers, and deployment bags for the two drogue and three main parachute systems Is 573 lb. Space for the packed system is limited and requires a high packing density for the parachutes. The packed parachute density is 44 lb per cubic feet.

Figure 13:
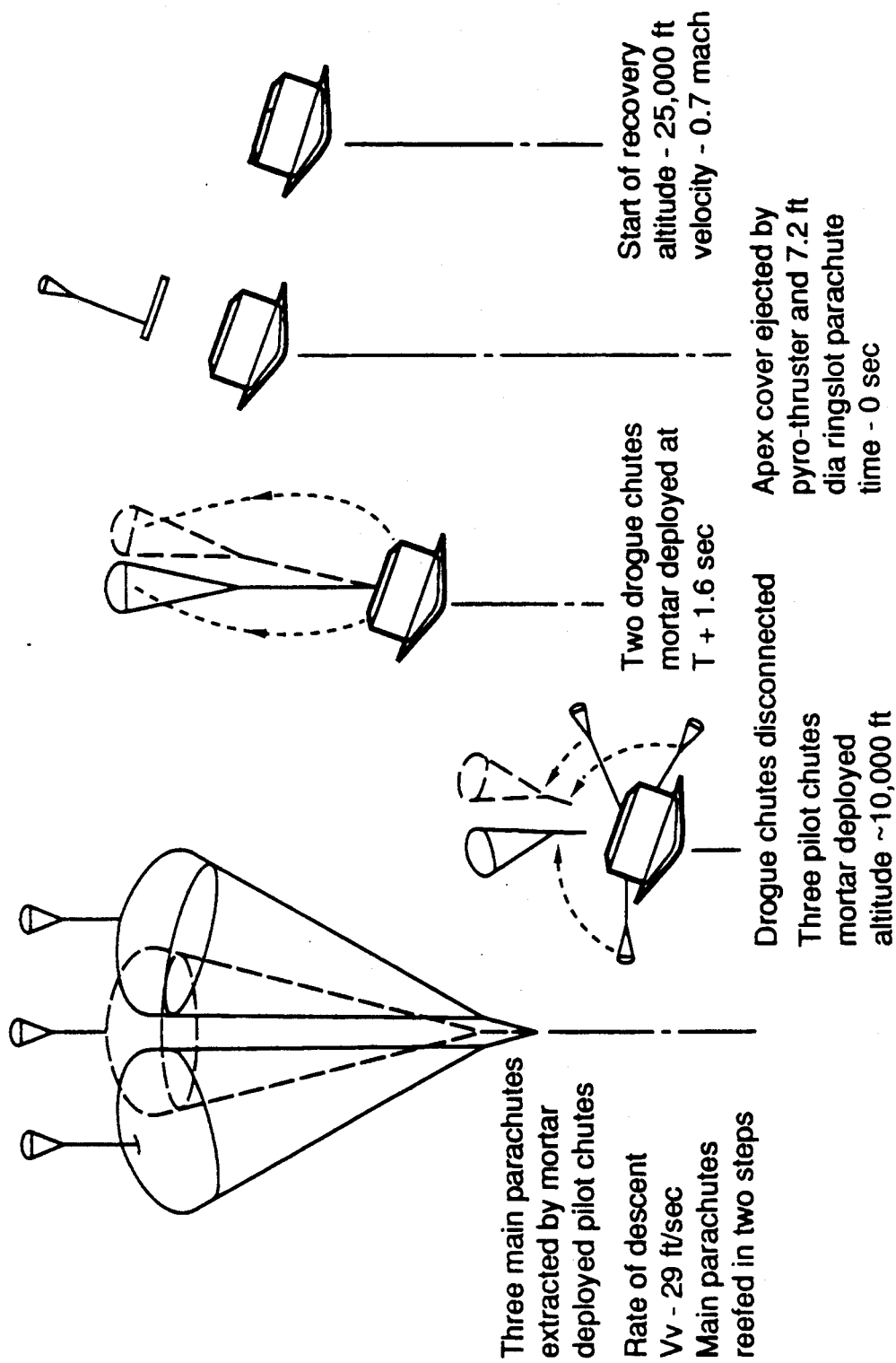
FIG. 13 is representation of the return vehicle recovery system deployment for a normal landing.

The sequence of deployment of the recovery system is depicted in FIG. 13. Upon barostat signal at 25,000 ft, the cover used for protection of the parachute installation from ultraviolet light and reentry heat is ejected by a pilot chute. The sequence controller is activated at this point and, at 1.6 seconds after cover ejection, the two reefed drogue chutes are mortar deployed. After 6 seconds, the drogues are disreefed. Another barostat signal at 10,000 ft disconnects the drogue chutes and ejects the three pilot chutes. The pilot chutes are mortar deployed normal to the command module main axis. The pilot chutes extract the three reefed bin parachutes which are disreefed in two steps after 6 and 10 seconds. Deployment functions are performed by parallel, fully automatic sequencing systems with a manual override for backup.

b. Locator Beacon

The Search and Rescue Satellite-Aided Tracking System (SARSAT)/Space System for Search of Vessels in Distress (COSPAS) is an international project used to reduce the time required to accurately locate and quickly rescue air, maritime, or terrestrial distress victims. The SARSAT/COSPAS is composed of emergency beacon transmitters, the SARSAT/COSPAS satellite system, and ground stations. Two systems detect the emergency Deacons. One system broadcasts on 121.5/243 megahertz (MHz) and the other operates on 406 MHz. The 406 MHz system provides a higher probability of detection and greater accuracy of position information. The position accuracy is approximately 3 miles for the 406 MHz system and 12 miles for the 121.5/243 MHz system. The satellite system receives the beacon signal from the return vehicle, derives position information, and relays the information to a ground station for proper action. The SAR forces receive the beacon signal directly when within line-of-sight of the vehicle. The beacon transmitter located on the return vehicle will be activated at parachute deployment. The beacon transmitter is built to survive crashes, hazardous terrain, water, and severe weather.

10. Configuration and Mass Property Summary

In determining the optimal vehicle configuration, several requirements needed to be met and other considerations were analyzed. Requirements for the return vehicle configuration were compatibility with the Orbiter payload bay and a Space Station Freedom berthing ring, good aerodynamics and flotation characteristics, accommodations for a crew of six, and a well-defined c.g. on the vehicle centerline. Other design considerations included minimal pressurized volume, seat arrangement, seat attenuation clearances, number of hatches and windows, hatch operation, and ease of crew ingress and egress.

A non-integrated design was chosen for the heat shield and crew module in an effort to provide stability for the vehicle in the water after landing. In doing this, greater flexibility was allowed in the selection of a heat shield shape. A Viking-class heat shield was selected due to its aerodynamic stability and good packaging volume. The diameter of the shield was maximized to the limit of the Orbiter payload bay. The non-integrated design also allows the size of the crew cabin to be minimized in volume. Instead of having a maximum diameter that is the same as that of the heat shield, the crew cabin diameter is smaller, i.e., it only needs to be large enough to accommodate a crew of six. This is conveniently done with three crewmembers sitting side by side in a two tier arrangement. The seating arrangement was based on ease of ingress/egress, attenuation capability, and minimum c.g. travel for different sizes (2 to 6 people).

The shape defined by the Viking heat shield is carried over to the base of the crew cabin which is separated from the heat shield. The separation allows water to flow in between the structures which enables the vehicle to sit low in the water. The result is that the heat shield will be under the water line and will act as an anchor. This will reduce the dynamic oscillations felt by the crew. The two structural elements will be connected by struts that will be designed to attenuate if the vehicle lands on land.

Since the design permits the vehicle to sit fairly low in the water, a side hatch was not provided for crew egress. Ingress and egress from the cabin is through a 50-in. square hatch at the top of the vehicle. The hatch moves inward 6 in. and then rotates to the side of the cabin. This method of operation sweeps out the least volume within the cabin. During the quiescent phase, both the Space Station and return vehicle hatches will be left open. Upon use of the return vehicle, the crew will board the vehicle and the crewmember on the outside seat on the upper tier will close the Space Station hatch and then the return vehicle hatch. The volume between the two hatches will then be depressurized. Egress from the return vehicle can be easily accomplished by standing on the leg supports of the upper seats.

Figure 14:
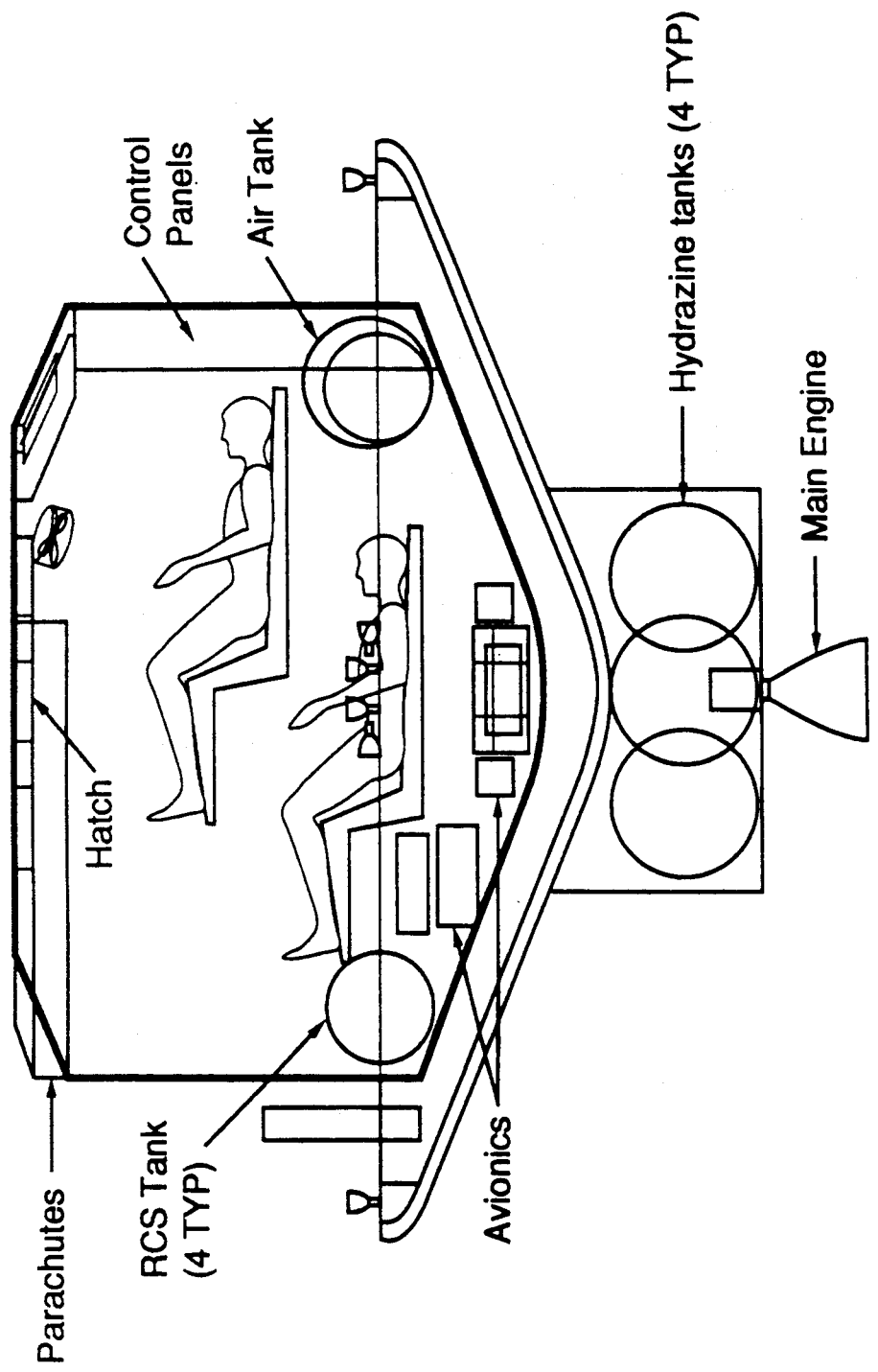
FIG. 14 is a representation of a side view of the return vehicle.

A side view of the crew cabin arrangement is depicted in FIG. 14. The general locations of the various subsystems can be determined from this figure. An effort was made to locate most of the equipment as low as possible to increase the stability of the vehicle. The avionics are positioned below the lower seats with a 6-in. clearance allowed for attenuation. The displays are situated in control panels to the side and above the crewmembers on the upper level. The air tank provided for life support is located close to all crewmember heads to reduce the length of the air lines. The reserve battery system is positioned on the outside of the cabin wall. The parachute system is installed on the crew cabin upper surface in a horseshoe arrangement around the berthing ring. The cold gas RCS is located on a structural ring supporting the heat shield at its maximum diameter. The valves, thrusters, and tanks are attached to this ring. The main propulsion system is installed in a service module that is attached to the nose of the heat shield. The service module will be bolted to the heat shield nose with isolation pads around the perimeter of the module. This attachment bolt will be pyrotechnically separated and the service module will be jettisoned after the deorbit burn.

Figure 15A:
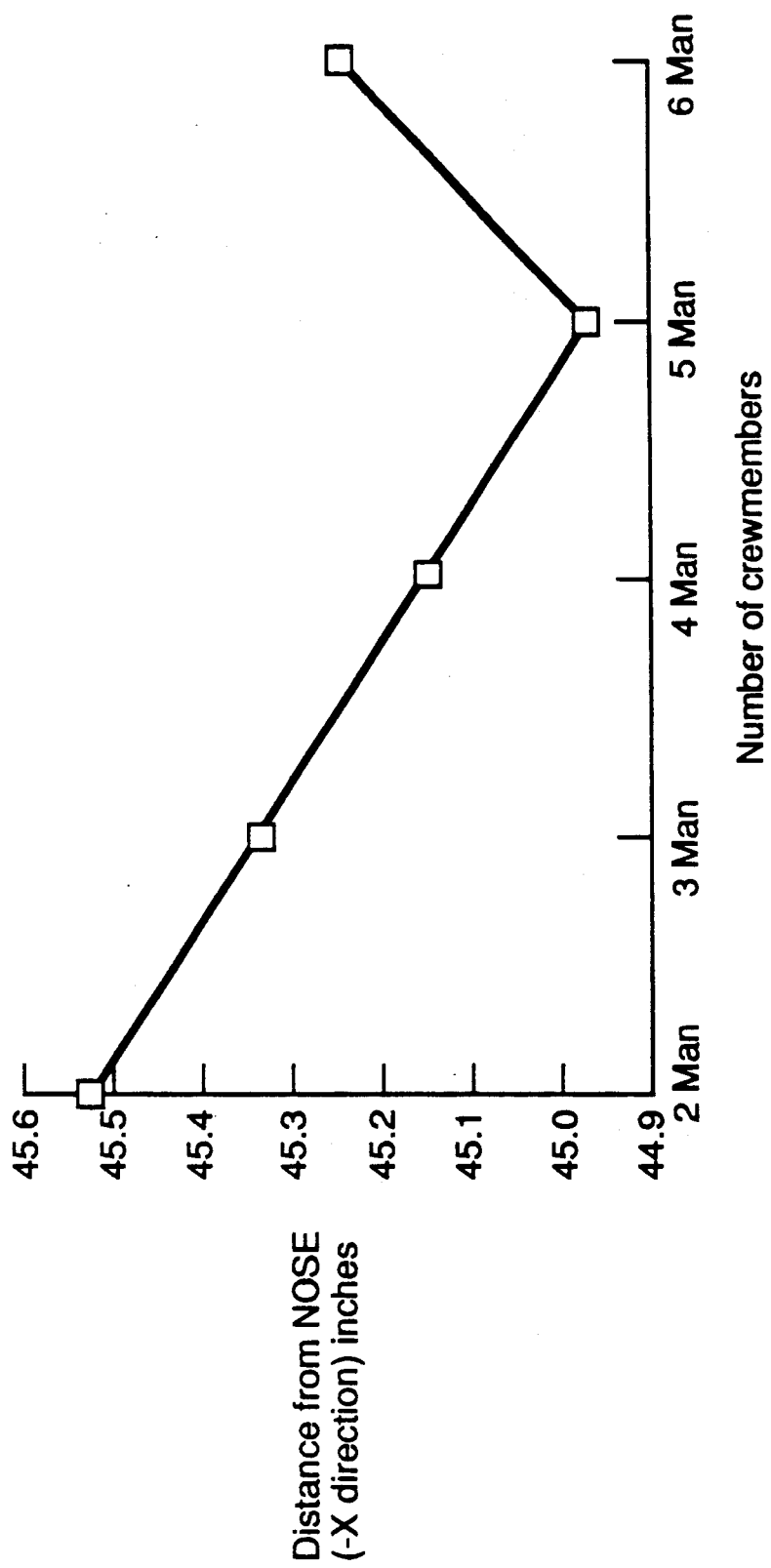
FIG. 15A is a graph showing the fluctuations of the center of gravity along the vehicle line of symmetry as a function of the number of crew members.
Figure 15B:
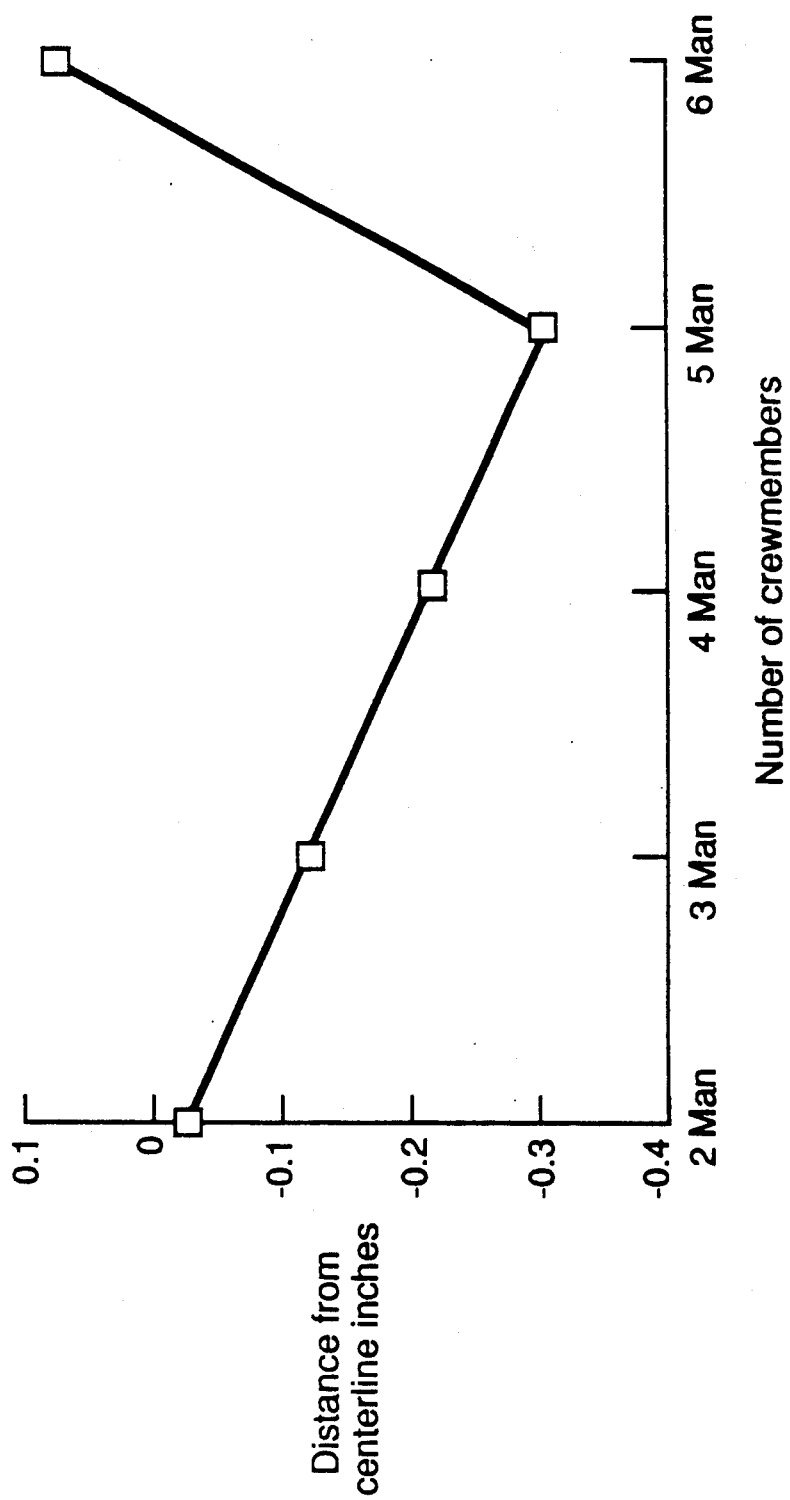
FIG. 15B is a graph showing the fluctuations of the center of gravity perpendicular to the vehicle line of symmetry as a function of the number of crew members.

The crew and equipment were located to have the c.g. along the axis of symmetry of the vehicle as close to the nose of the heat shield as possible. Upon entry, the c.g. is 3.77 ft (45.2 in.) aft of the nose for a crew of six. The location of the c.g. varies depending on the number of crewmembers, but this difference is not significant for this seating arrangement. FIG. 15A shows the fluctuation of the c.g. along the vehicle line of symmetry while FIG. 15B shows the variation perpendicular to the line of symmetry.

A second-generation weight breakdown summary is provided in Table 5. The weight of each subsystem is delineated in the proper category in items 1–8 for the dry weight estimate. The weight estimate for each subsystem includes an additional 20 percent by weight for mounting and installation. For example, the 902 lb listed for the avionics system includes 150 lb for mounting and installation as well as 752 lb for the actual hardware. A 15-percent growth estimate (item 9) is also included in the dry weight total. This growth allowance is only applied to estimated subsystem weights and not to existing hardware. The resultant dry weight is 7828 lb. Items 10 and 11 include weights that are added to the dry weight to get the inert weight of the vehicle. The inert weight of 9100 lb is the weight of the vehicle at splashdown. The gross weight includes Items 12 and 13 which are expended during the mission. The gross weight of 9231 lb is the estimated weight of the return vehicle with a crew of 6 at Space Station separation.

TABLE 5

| WEIGHT BREAKDOWN SUMMARY | | |
|---|---|---|
| 1. Structure | | 2083.00 |
|    Body structure | 2083.00 | |
| 2. Protection | | 1305.60 |
|    Thermal protection syst. | 1305.60 | |
| 3. Propulsion | | 324.00 |
|    Cold gas RCS system | 324.00 | |
| 4. Power | | 121.20 |
|    Reserve batteries | 121.20 | |
| 5. Control | | 0.00 |
|    no weights associated with control | 0.00 | |
| 6. Data | | 992.40 |
|    Avionics system | 902.40 | |
|    C&T | 90.00 | |
| 7. Environment | | 826.50 |
|    ECLSS | 480.42 | |
|    Displays | 196.68 | |
|    Controls | 38.40 | |
|    Panels | 100.20 | |
|    Lighting | 10.80 | |
| 8. Other | | 1317.60 |
|    Crew restraint seats | 525.00 | |
|    Landing system | 573.00 | |
|    Mounting and installation | 219.60 | |
| 9. Growth | | 857.70 |
|    15-percent allowance except for existing hardware | 857.70 | |
| | Dry weight = | 7828.00 |
| 10. Cargo | | 60.00 |
|    Incidental cargo | 60.00 | |
| 11. Non-cargo | | 1212.00 |
|    Crew | 1200.00 | |
|    Pressurant (GN2) | 12.00 | |
| | Inert weight = | 9100.00 |
| 12. Propellant | | 68.00 |
|    Cold gas (GN2) | 68.00 | |
| 13. Non-propellant | | 63.00 |
|    Life support fluids | 63.00 | |
| | Gross weight = | 9231.00 |

A volumetric analysis was performed on the crew cabin to determine the freespace available for the crew. The volume contained within the pressurized vessel is 422 ft3. This volume equates to 70 ft3 per crewmember. This falls in the range available in Apollo and Gemini where the pressurized volumes per crewmember were 122 ft3 and 40 ft3, respectively. The return vehicle has 175 percent more volume available per crewmember than Gemini had, which is the same ratio of volumes between Apollo and the return vehicle. The equipment in the return vehicle occupies 46 ft3, leaving a freespace volume of 376 ft3.

Space Station Requirements

1. Location and Thermal Considerations

Two return vehicles will be berthed at Space Station Freedom and suitable locations for each vehicle had to be found. Determination of the available berthing ports at the space station was obtained by using NASA's November, 1987 Reference Baseline configuration. However, thermal environment and deployment considerations were taken into account for the location of the return vehicles.

Seven locations on the four nodes were available for berthing the return vehicles. The berthing ports on the sides of the module plane were not considered due to deployment considerations. A return vehicle deployment in the port or starboard direction would pose problems with the articulating solar arrays. Elimination of these locations reduced the available locations to four. Of the four locations, two were located above and two were located below the module plane. The two vehicles should be mounted on the same side of the module plane if possible to minimize the differences in deployment operations and vehicle design.

Consideration of the thermal environment led to selection of the two available ports below the module plane. The Space Station will have a local vertical/local horizontal (LVLH) attitude which results in a more benign thermal environment below the module plane. This is due to the fact that this side is always facing the Earth. Vehicles located above the module plane would alternately face the Sun and deep space, resulting in large temperature gradients.

Figure 16:
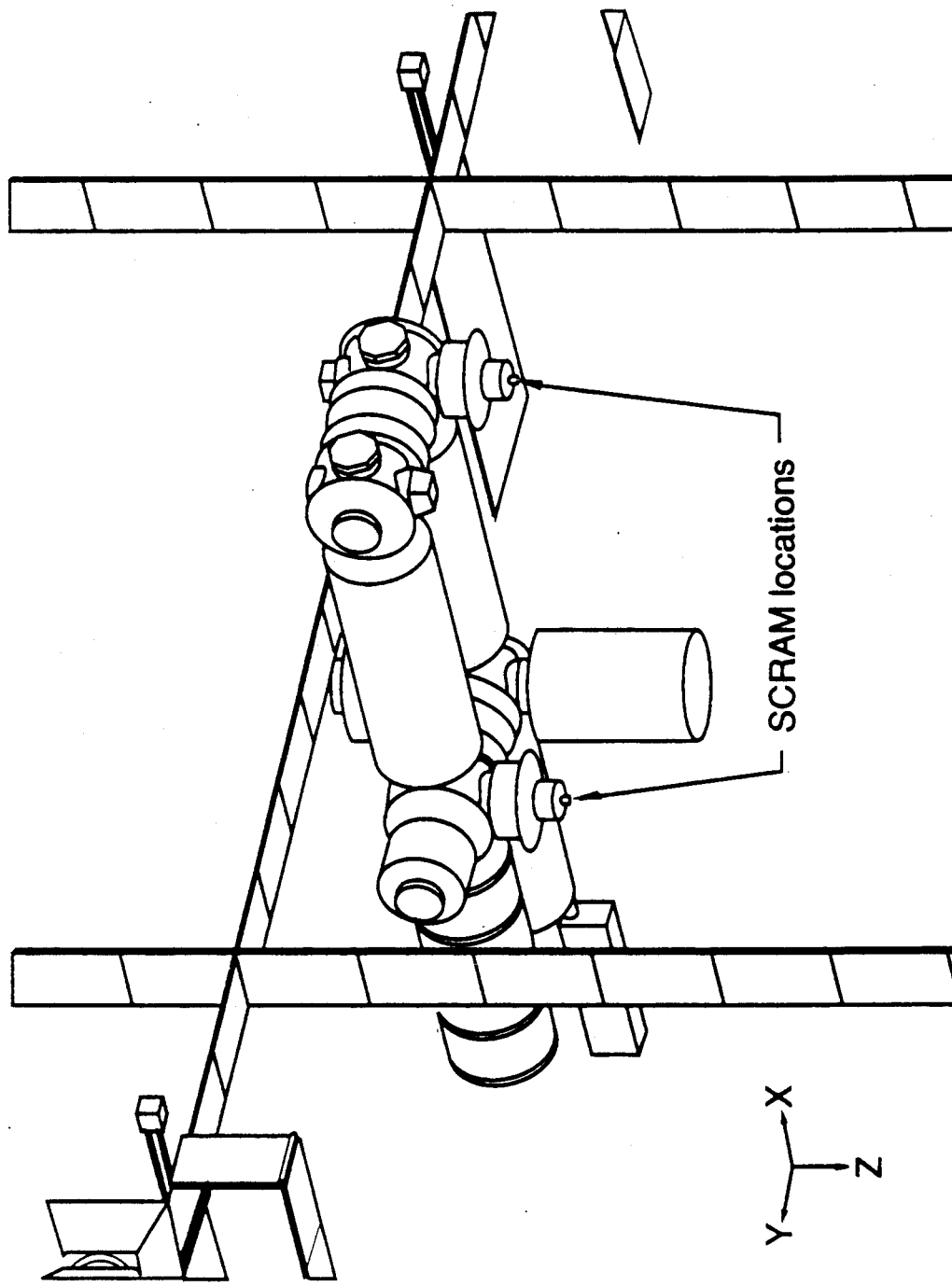
FIG. 16 illustrates placement of the return vehicle on the Space Station Freedom.

Four berthing ports are located below the module plane. Of these, two locations are available for return vehicle berthing. The bottom ports on the forward starboard side node and the aft port side node have a cupola and the logistics module berthed to them, respectively. This leaves the bottom facing berthing ports on forward port side node and the aft starboard side node for the two return vehicles. FIG. 16 depicts return vehicle locations.

2. Berthing Adapter

The return vehicle will be attached to the Space Station by means of a berthing adapter similar to that being proposed for the logistics module. This adapter comprises an 80-in. diameter berthing ring with capture guides that is mated to a similar ring on the space station node. The two rings are mated by means of 16 structural latch bolts spaced evenly around the perimeter of the rings.

Once the return vehicle is delivered to Space Station Freedom by the Shuttle Orbiter, the space station remote manipulator system (RMS) will maneuver the vehicle to its proper orientation and a crewmember will manually mate the vehicle by turning the latch bolts. The return vehicle berthing ring will be mounted to the top of the pressure vessel by eight bolts through a mounting flange. The eight bolts will incorporate nuts that can be pyrotechnically activated for a quick release of the return vehicle from the space station. Leaving the berthing ring at Space Station Freedom after return vehicle deployment also leaves a clean upper surface on the vehicle required for parachute deployment.

Locations for utility connectors are internal to the berthing ring around the 50-in. square hatch. Connections for power and data management will be passed between the return vehicle and the space station by means of these connectors. A fan and duct used for ventilation of the return vehicle while berthed to the space station will be incorporated in this area also.

3. Support Requirements for Return Vehicle

Space Station Freedom will be required to provide accommodations for the return vehicle in addition to the docking interface during the quiescent phase. Power input to the return vehicle for periodic checkout and heaters must be provided by the space station. The power system for the space station is envisioned to have backup batteries in case of failure and is assumed to always have the capability to provide power to the return vehicle. The importance of this assumption lies in the fact that the space station computers provide state vector and attitude updates to the return vehicle prior to departure. This assumption holds true for large computer facilities on the ground that have backup power systems that will instantaneously engage after a power surge or failure. A data interface will be used for the state vector and attitude updates as well as for periodic system tests and checks.

Along with the navigation input to the GN&C system, interfaces are needed for the data management system input to the C&W system, the master timing unit input to the computer, and a ventilation fan and duct. An RMS grapple fixture will be required on the return vehicle for berthing operations.

Flight Dynamics

1. Mission Scenario

A typical mission timeline for a return vehicle escape from Space Station Freedom provides a good introduction for a discussion of the flight dynamics and logistics of the mission. The timeline is listed in Table 6. After entry into the capsule, departure from the space station can be initialized within 5 minutes. This is due to the fact that the return vehicle environment has been maintained in equilibrium with the space station via thermal protection, ducts with fans, and an open door. In addition, power is immediately supplied, first through an umbilical and then autonomously with batteries. The crew must simply initialize the onboard air supply, don air supply masks, and close the hatch. Systems startup is manually executed and space station IMU information (attitude and state vector) is automatically transferred to the return vehicle IMU and computer. After verification of the completed functions, a release is manually executed with the firing of explosive release bolts and separation is initiated by a computer-controlled short RCS thrust period.

In the initial free-flying mode while separation distance is created between the return vehicle and Space Station Freedom, the crew inputs an approximate crew weight to the computer via keyboard to be used in calculating deorbit burn initiation and duration. The computer presents the landing site options with distances from rescue bases and local time of touchdown so the crew can approve of one option. Within 15 minutes from crew entry, the computer has calculated the burn initiation time and established a pre-burn attitude utilizing the RCS.

A maximum of 90 minutes or one orbital revolution follows in which the vehicle can loiter to reach the appropriate deorbit initiation location.

TABLE 6

MISSION TIMELINE

| Event | Time (MET) |
|---|---|
| Crew Entry | 0:00 |
| Manual Air Supply Startup/Crew Dons Masks | 0:02 |
| Systems Activation/IMU Initialized from the SS | 0:04 |
| Departure from the SS | 0:05 |
| Crew Weight Input | 0:06 |
| Landing Site Options from Computer | 0:10 |
| Landing Site Selection by Crew | 0:14 |
| Pre-burn Attitude Established | 0:15 |
| Burn Initiation Calculated by Computer | 0:16 |
| Loiter to Reach Burn Position (90-minute max.) | 0:16 |
| Deorbit Burn Initiated by Computer | 1:46 |
| Burn Terminated by Computer | 1:57 |
| Propulsion Module Jettisoned | 1:58 |
| Crew Capsule Lateral Maneuver | 1:59 |
| Entry Attitude Established by IMU/RCS | 2:21 |
| Roll Rate (1 rpm) Initiated | 2:24 |
| Entry Interface | 2:27 |
| Parachute Deployment/UHF Beacon Activated | 2:39 |
| Touchdown | 2:44 |
| Manual Vents Open/Circulation Fans Started | 2:46 |

At the appropriate time, the deorbit thruster is fired by the computer with the control system maintaining the proper thrust orientation. Guidance logic corrects the burn duration and/or direction for proper landing site targeting and eventually terminates the burn. After the trajectory is computer verified, the propulsion module is jettisoned and the crew capsule automatically performs a small lateral maneuver with the RCS to escape from behind the propulsion module. If the maneuver is not performed, the crew module could recontact the propulsion module on atmospheric entry. Finally, the control system establishes the 0-deg entry angle-of-attack and a 1 rpm roll rate.

Entry interface is reached approximately 2.5 hours into the mission assuming the entire 90-minute loiter time was consumed. Parachute deployment and UHF beacon activation are triggered by barometric pressure with navigational altitude as backup, and touchdown is achieved in less than 3 hours mission elapsed time (MET). On touchdown, the crew opens vents and powers up the circulation fans for thermal control. Verification of UHF beacon activation is made and any visual location devices are actuated.

Individual mission events are detailed in full below.

2. Space Station Departure

Following return vehicle release from Space Station Freedom, the eight aft-facing cold gas RCS thrusters provide a departure acceleration of 0.12 ft/sec/sec. In approximately 4 minutes, a separation distance of 0.5 nautical mile (n. mi.) can be achieved. The departure thrusters can be terminated manually when sufficient separation is attained or a programmed maneuver can be adhered to. Attitude is maintained by the computer and flight control system. If rotation rates are imparted to the vehicle as a result of vehicle release, the RCS has been fully designed to quickly achieve stability. As an example, an attitude rate of 5 deg/sec can be nulled by a single RCS jet in approximately 10 seconds.

3. Target Site Selection

After initialization of the IMU from Space Station Freedom, the return vehicle state vector is monitored by integration of accelerometer measurements from the IMU. Calculation of the vehicle orbit relative to the Earth is performed by the computer followed by a comparison of the upcoming groundtrack with stored rescue site options. Distances to the rescue sites and predicted local times of landing are displayed to the crew. Based on these factors, the crew can select one site for further analyses. Using knowledge of the orbital parameters, desired entry flight path angle, and vehicle weight input by the crew, the computer can determine the approximate deorbit burn duration and ignition point required to approach the selected site as close as possible. If the predicted trajectory time and landing distance to the rescue force are acceptable, the crew verifies this site as a guidance target.

4. Deorbit Burn and Entry Targeting

For guidance and control simplicity, maintaining a 0-deg angle-of-attack throughout all flight phases is desirable. Therefore, use of the deorbit thrust direction as a control variable in targeting guidance is not recommended. It is felt that the only control variable required in deorbit guidance is the thrust duration. Thrust would be maintained in the direction opposite the velocity vector; i.e., at a 0-deg angle-of-attack. This significantly simplifies both the prediction of trajectory in the target site selection and the guidance used during deorbit burn.

At the appropriate ignition time, the deorbit burn is executed with periodic recalculations of the predicted trajectory. Thrust is maintained until the distance from the predicted landing site to the target site is minimized. In periodic predicted trajectories, entry conditions are checked. If not within heating and skipout constraints, the targeting control is overridden. That is, the deorbit burn must first satisfy the atmospheric entry conditions before targeting will be considered. If the initial trajectory prediction and burn initiation point were fairly accurate, there should be no problem in varying the thrust duration as required to hit the target and still enter within the constraint corridor. The deorbit burn is terminated when entry constraints are met and rescue distance is minimized.

5. Propulsion Module Separation

It is imperative to separate and maneuver the propulsion module laterally from the crew compartment before entry to avoid recontact due to aerodynamic forces. The ballistic coefficient of the spent propulsion module is much less than that of the crew capsule, thereby creating the possibility of the capsule "catching up to" the motor in the atmosphere. Initial separation is caused by pyrotechnic release and spring forces occurring at an altitude of approximately 260 n. mi. The capsule RCS jets are utilized to produce a lateral (in a direction perpendicular to ballistic trajectory) separation acceleration of $-0.03$ ft/sec/sec. Separation distance will continue to expand until entry interface at 400,000 ft altitude. If attitude rates are imparted to the capsule during separation or maneuver, automatic control can restore stability with the RCS.

6. Atmospheric Entry

Figure 17:
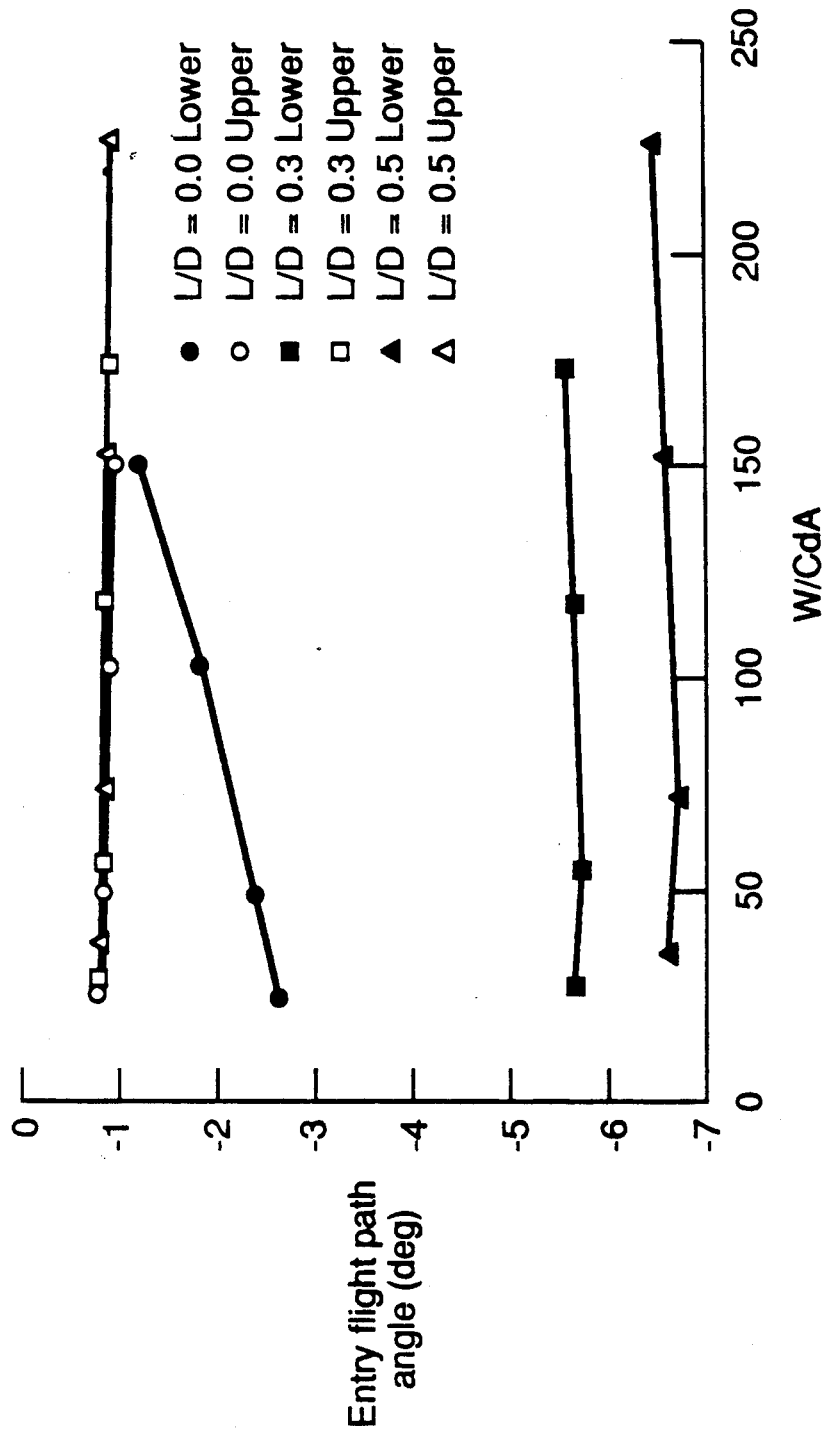
FIG. 17 is a graph showing entry flight path angles with a 26,000 ft. per second vehicle entry speed for several L/D ratios.

To ensure capture by the atmosphere, the entry flight path angle must be below an upper bound defined as a function of the entry velocity, L/D, and ballistic coefficient. A lower bound was defined to maintain the peak entry load factor below 8 g's. FIG. 17 presents these entry corridors for an entry velocity of 26,000 fps and several L/D values. Note that, for a ballistic entry (L/D=0), the corridor width is a strong function of the ballistic coefficient. For the return vehicle with a ballistic coefficient of 37 psf, skipout would occur for entry angles more shallow than −0.9 deg. At the other bound, entry g's would exceed 8 for entry angles steeper than −2.6 deg. The nominal entry conditions selected for deorbit from 270 n. mi. are a velocity of 26,015 fps and a flight path angle of −1.3 deg. This allows a 0.4-deg margin from skipout and maintains low entry g's.

As in all flight phases, the angle of attack during entry is intended to be 0 deg. An offset c.g. can cause a dispersed angle of attack resulting in lift being generated. This lift, since not accounted for in the trajectory predictions during deorbit, would induce targeting errors. To null out the effective lift direction, the vehicle is spun to a 1 rpm roll rate before entry. Two RCS Jets can accomplish this task in 6 seconds.

Figure 18:
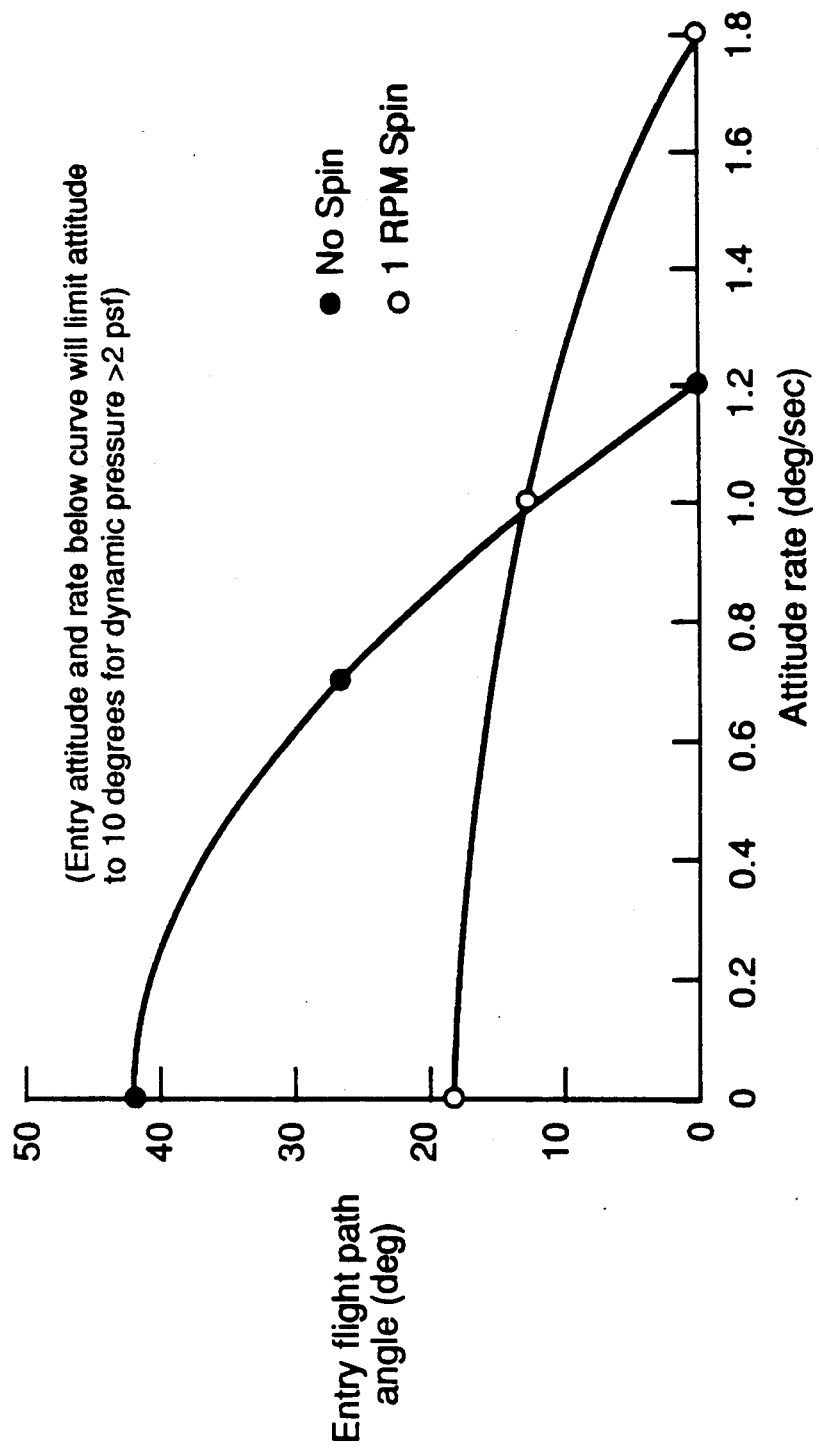
FIG. 18 is a graph showing acceptable entry attitudes and rates for the return vehicle.
Figure 19:
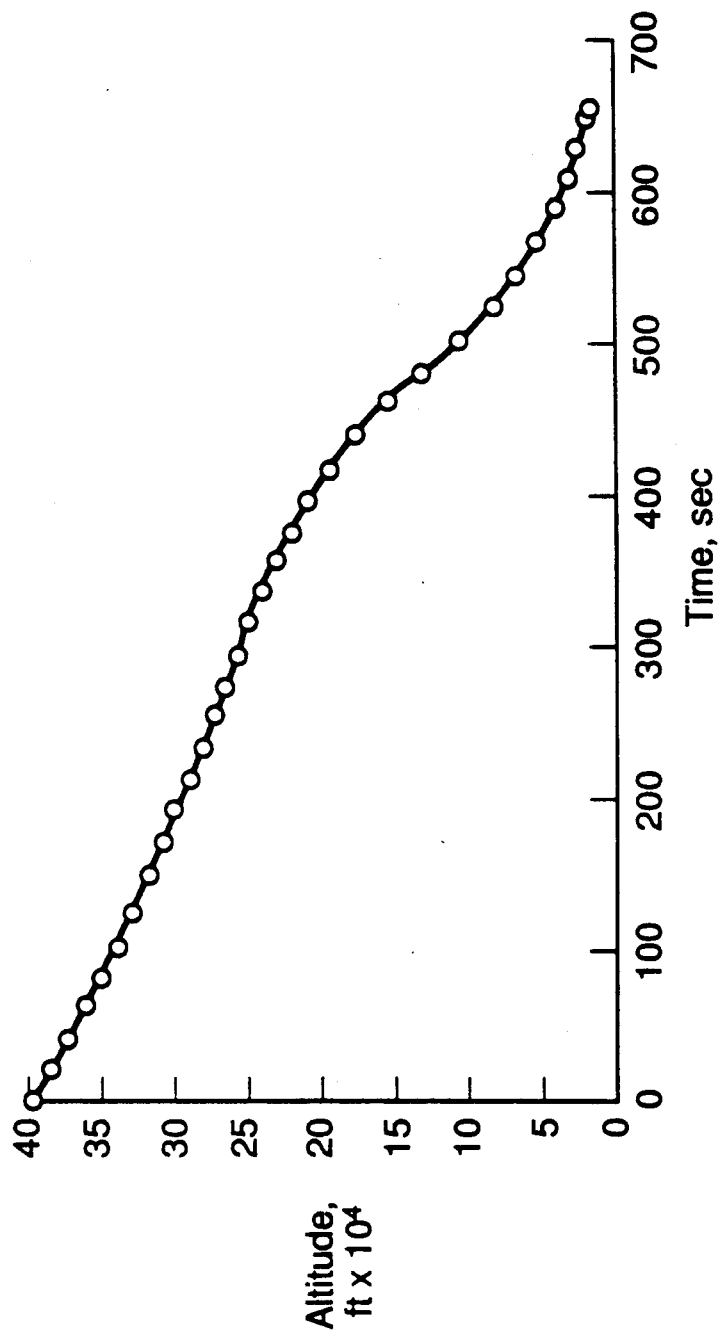
FIG. 19 is a graph showing altitude versus time for a nominal entry trajectory.
Figure 20:
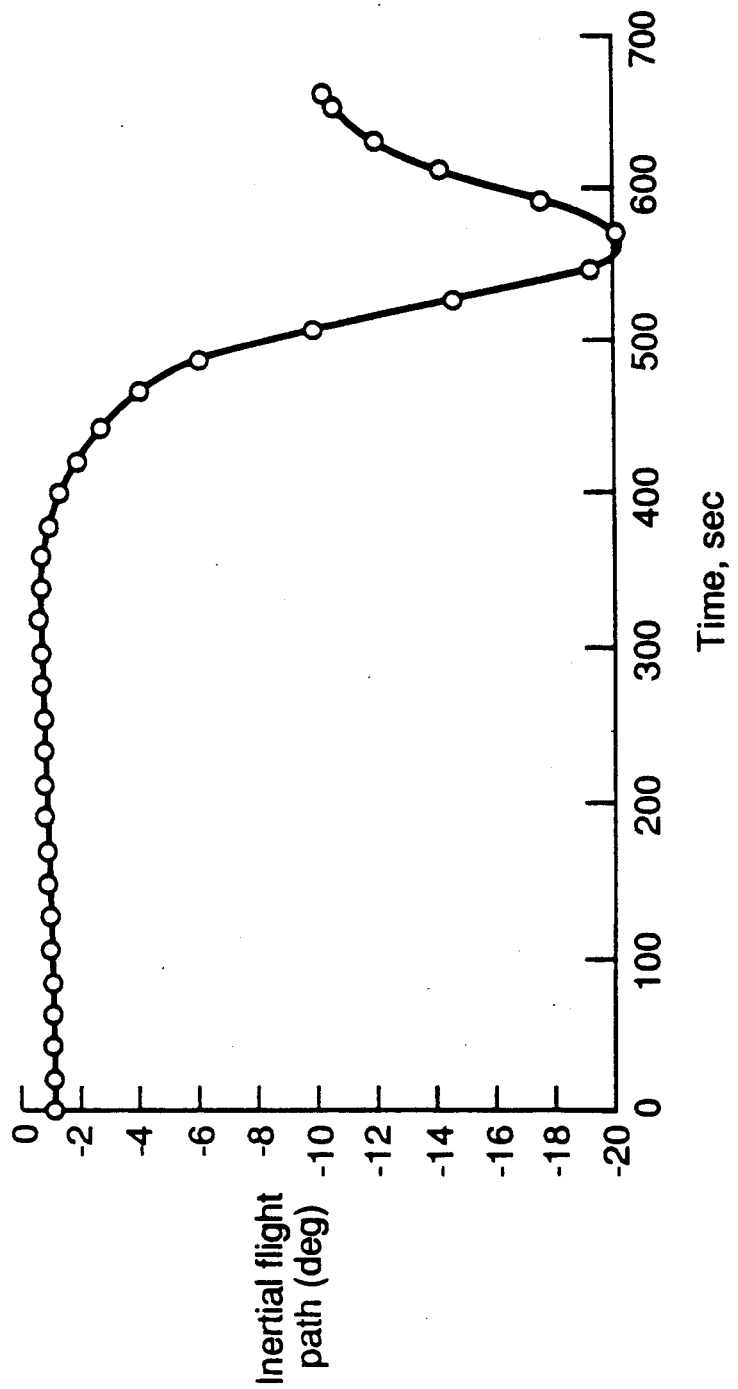
FIG. 20 is a graph showing inertial flight path versus time for a nominal entry trajectory.
Figure 21:
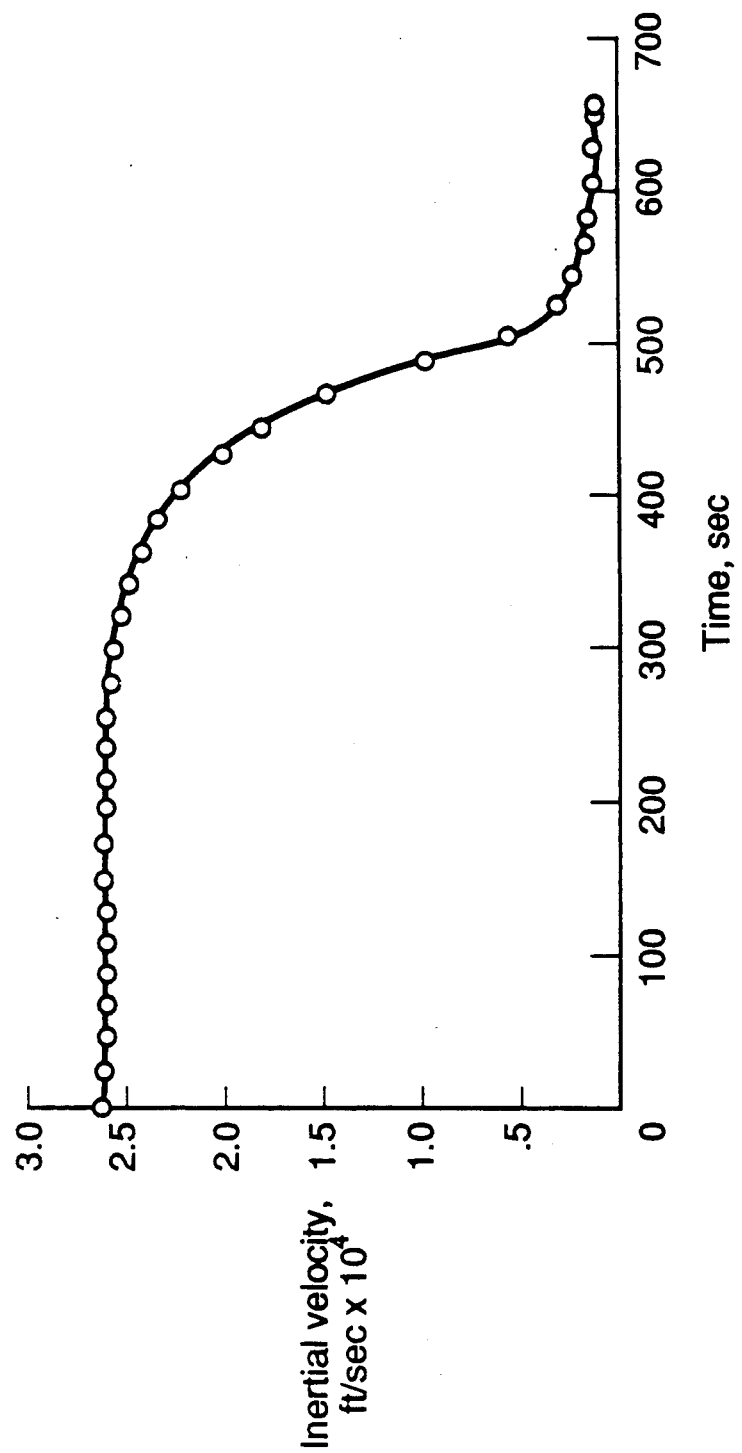
FIG. 21 is a graph showing inertial velocity versus time for a nominal entry trajectory.
Figure 22:
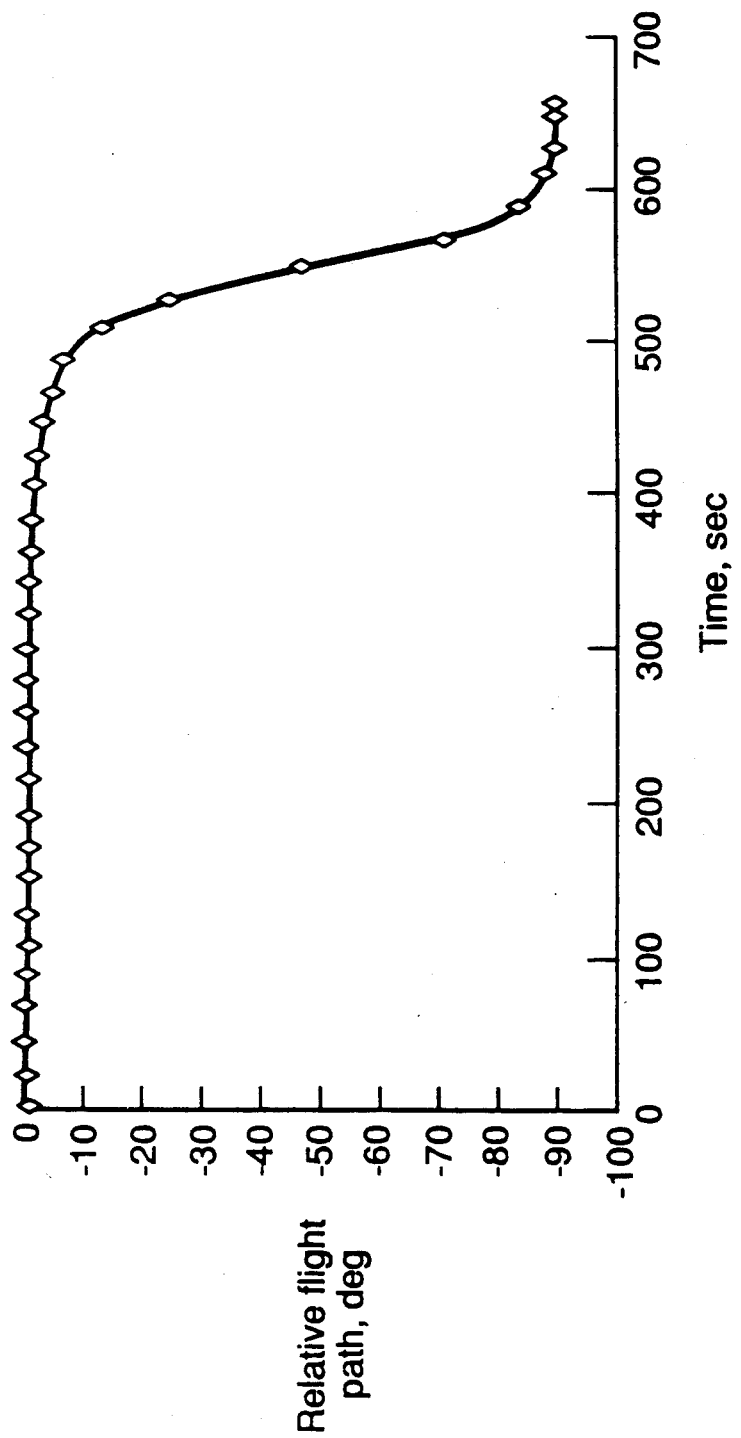
FIG. 22 is a graph showing relative flight path versus time for a nominal entry trajectory.
Figure 23:
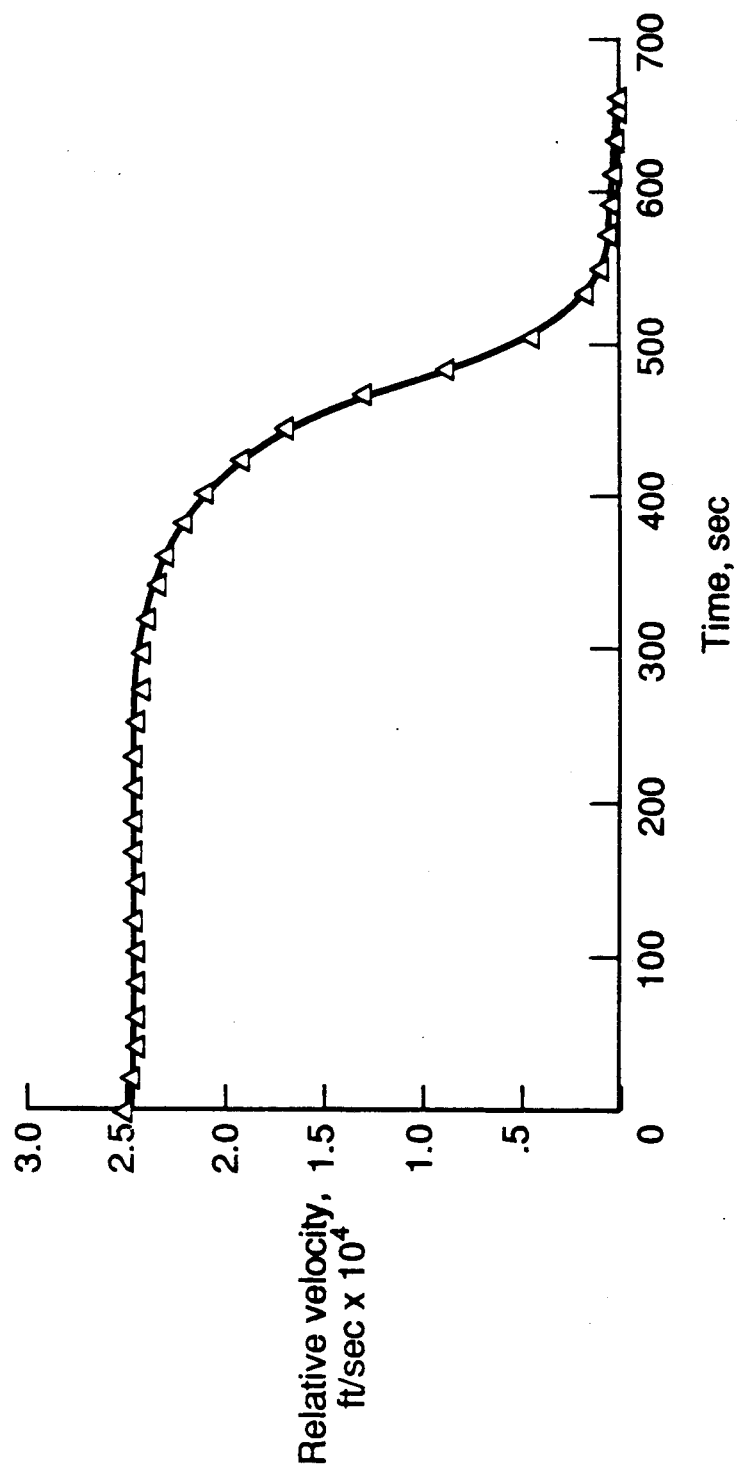
FIG. 23 is a graph showing relative velocity versus time for a nominal entry trajectory.
Figure 24:
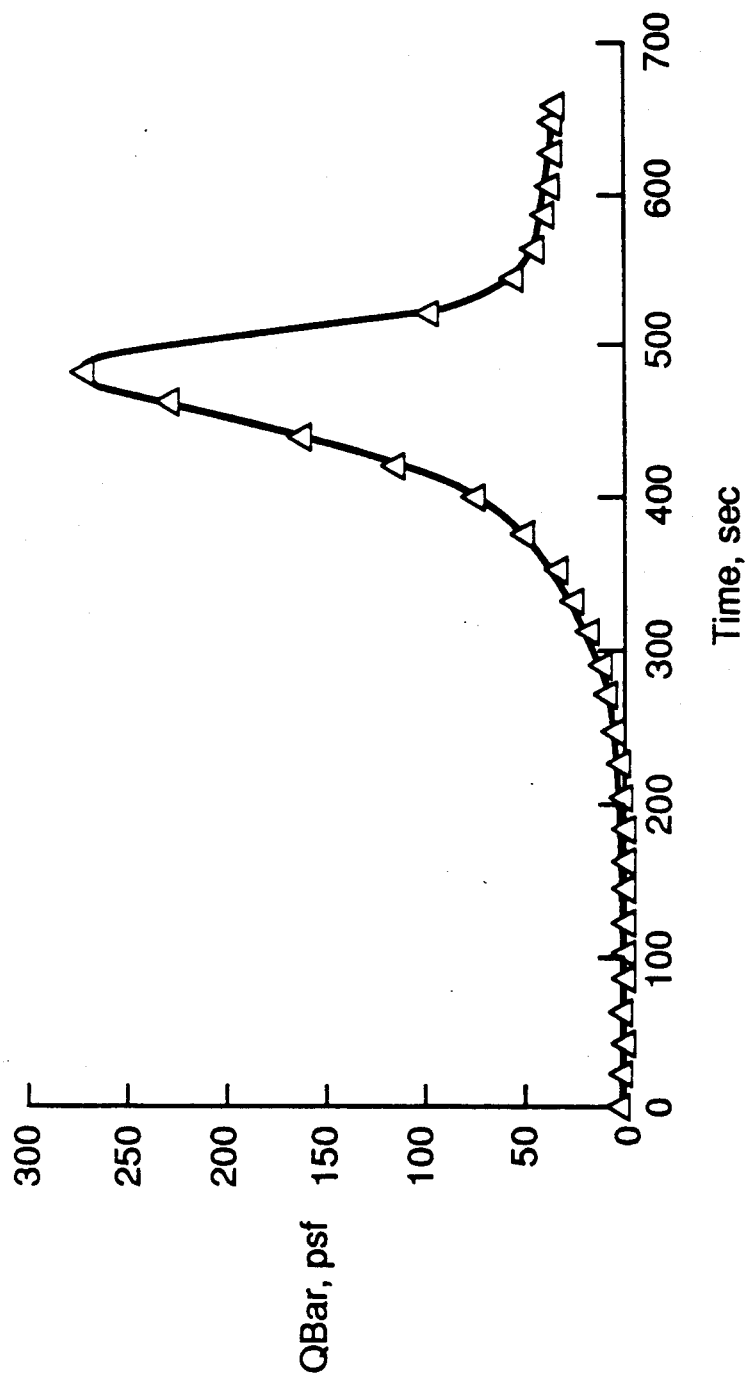
FIG. 24 is a graph showing barometric pressure versus time for a nominal entry trajectory.
Figure 25:
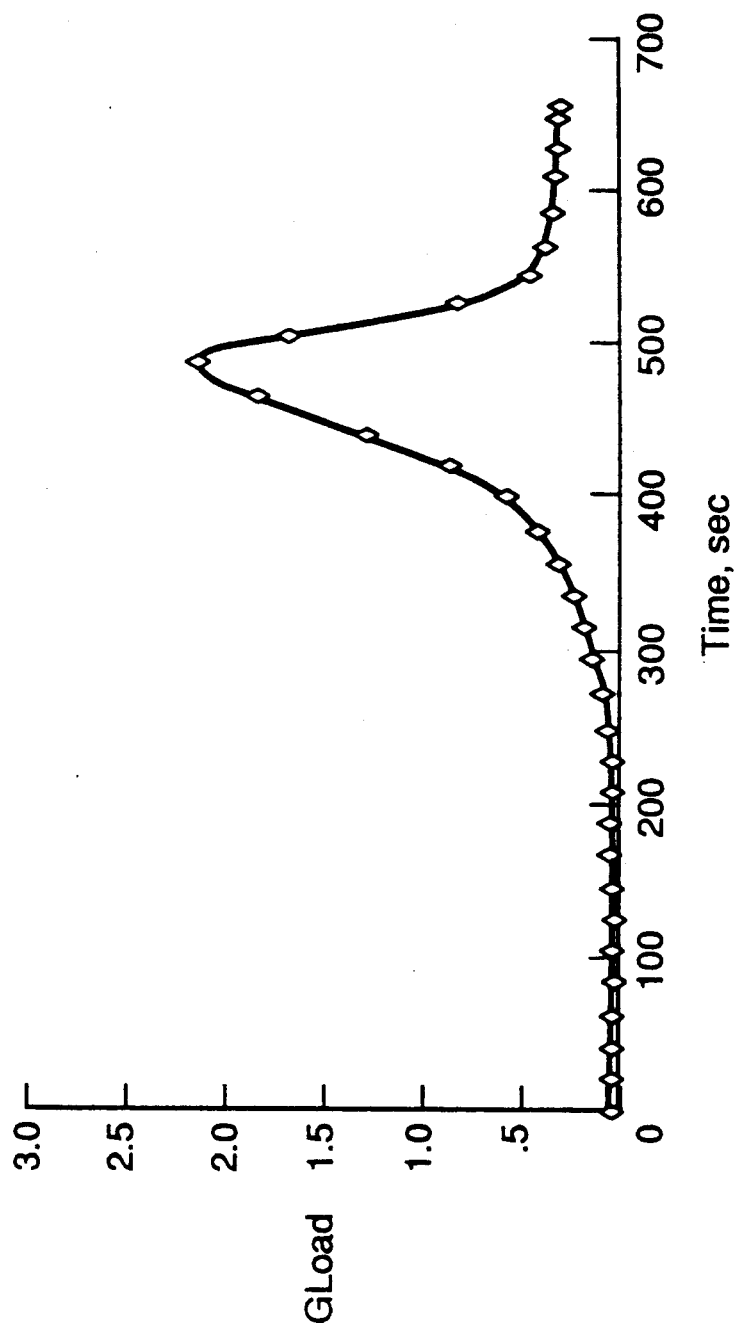
FIG. 25 is a graph showing "g" loading versus time for a nominal entry trajectory.
Figure 26:
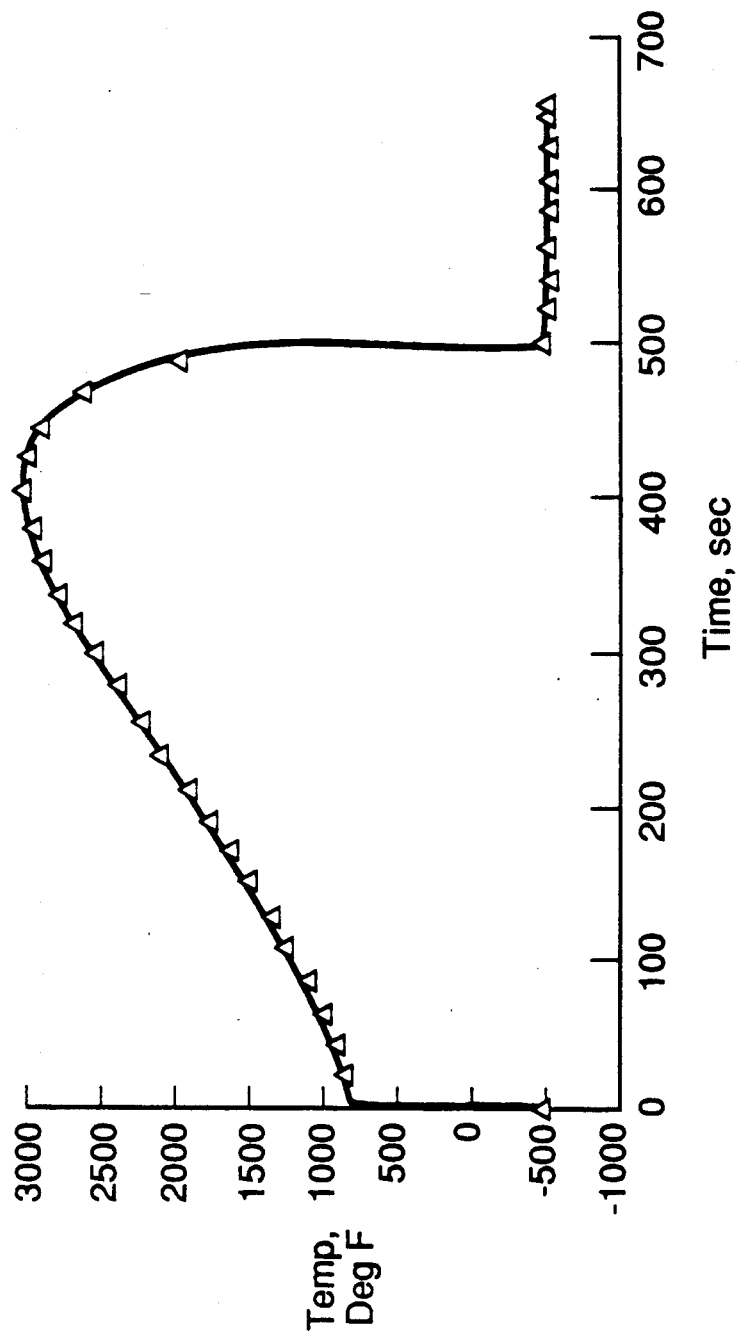
FIG. 26 is a graph showing temperature versus time for a nominal entry trajectory.
Figure 27:
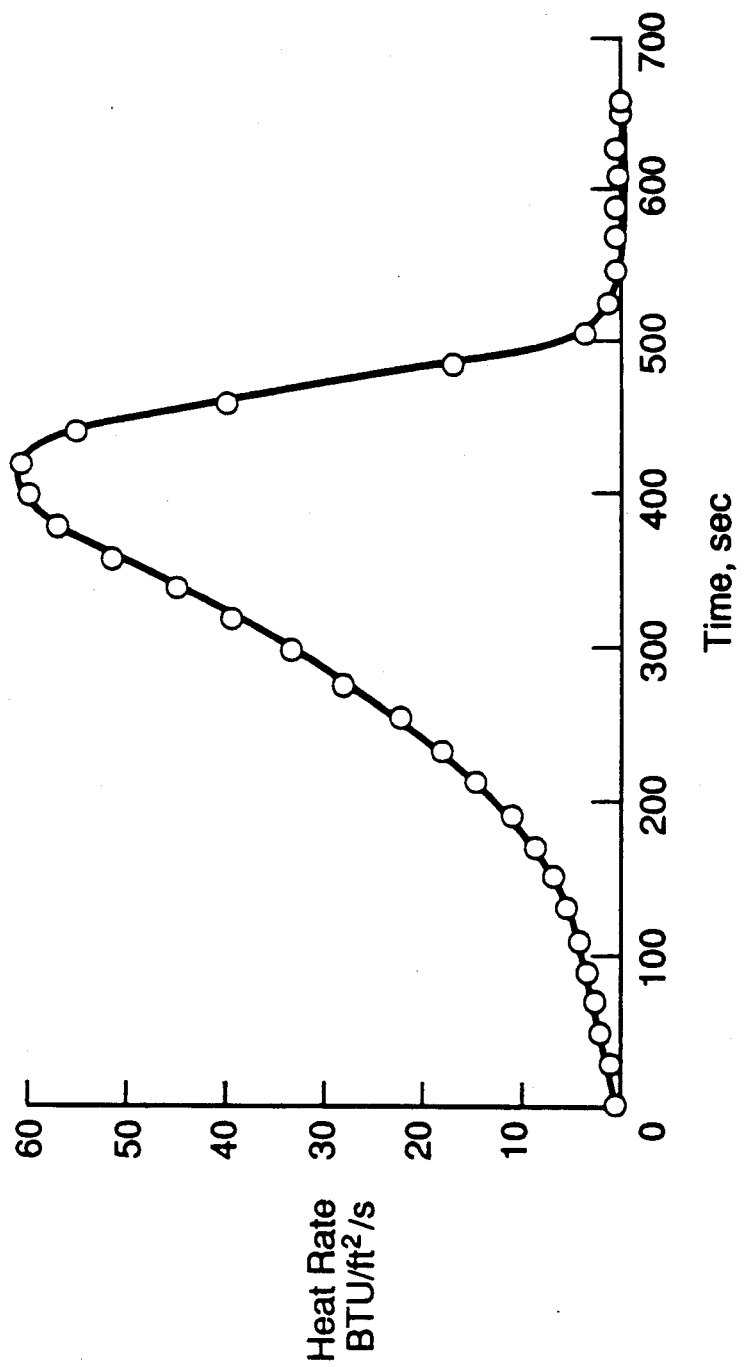
FIG. 27 is a graph showing heat rate versus time for a nominal entry trajectory.

Entry dynamics can pose a problem to the vehicle, particularly in causing heating to underprotected areas. An analysis was performed to determine the acceptable entry attitude dynamics that could be damped out naturally to less than 10 deg before a dynamic pressure of 2 psf is reached. This "acceptable" constraint is somewhat arbitrary. The results are plotted in FIG. 18 for both a no spin entry and a 1 rpm spin entry. For example, with the 1 rpm roll rate and no attitude (pitch) rate, the maximum acceptable attitude at entry would be 8 deg angle of attack. If entry occurred with more than 18 deg of attitude, the resultant pitch oscillations would not naturally damp out to less than 10 deg amplitude by the time 2 psf of dynamic pressure is reached. Likewise, with no entry attitude error, the maximum acceptable entry attitude rate would be 1.8 deg/sec. If these attitude and rate constraints cannot be achieved by the control system before entry, the control system will have to remain active during entry to assist in damping out the oscillations. This is a feasible option if required.

A nominal entry trajectory is presented in FIGS. 19 through 27. The altitude range shown is from entry at 400,000 ft to drogue parachute deploy at 24,000 ft. The inertial entry conditions were 20.015 fps in velocity and −1.3 degrees in flight path angle. Note that the maximum dynamic pressure, g-load, temperature, and heat rate were 275 psf, 7.3 g's, 3050° F., and 61 Btu/ft2/sec, respectively. The deceleration loads pose no threat to a normal, healthy crewmember although studies are being performed to assess if any detrimental effects would occur to a sick or injured crewmember. The heating environments will actually be somewhat cooler than shown due to computation methodology as described in section 4.3.8.

7. Parachute Deploy

As in the Apollo program, drogue parachute deployment should occur at approximately 25,000 ft altitude. In the nominal trajectory plots shown, this altitude corresponds to a relative velocity of 260 fps. However, the current trajectory simulation utilizes a constant drag coefficient throughout the entry based on a hypersonic Newtonian model. The Apollo program showed a reduction of 40 percent in the drag coefficient at parachute deploy as opposed to the hypersonic value. Therefore, it is expected that the chute deployment velocity should be higher. Drogue mortars are fired based on barometric pressure with manual switches as backup. An alternate deploy criteria could be navigation-derived altitude.

Mortar-deployed pilot chutes extract the three main chutes at approximately 10,000 ft and also use barometric pressure as the primary trigger. The final rate of descent with the nominal three chutes will be 27 fps.

8. Water Impact Loads and Attenuation Requirements

Figure 28:
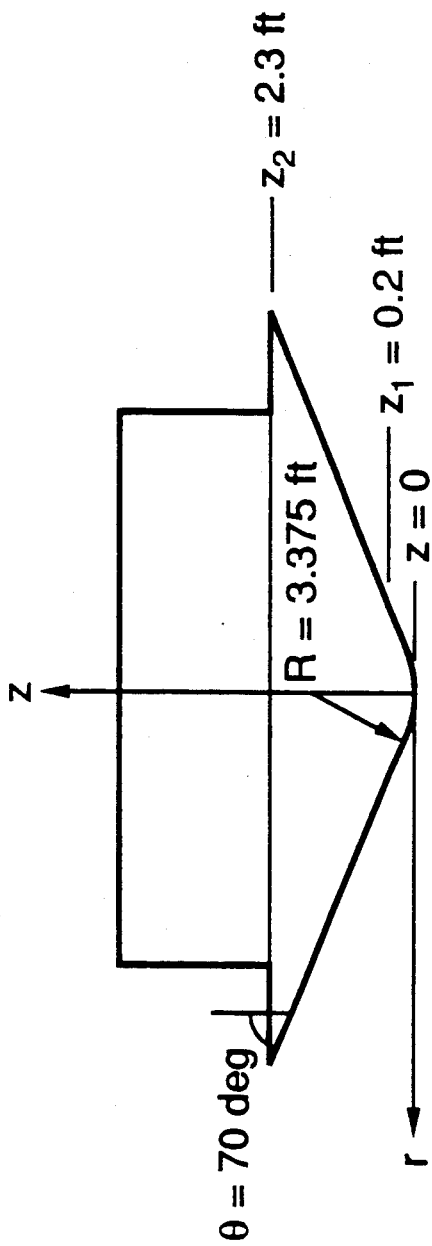
FIG. 28 is an illustration of the return vehicle geometry.

Water impact loads and couch attenuation requirements were determined using the method developed in reference 2. FIG. 28 shows the return vehicle geometry used in this analysis.

Figure 29:
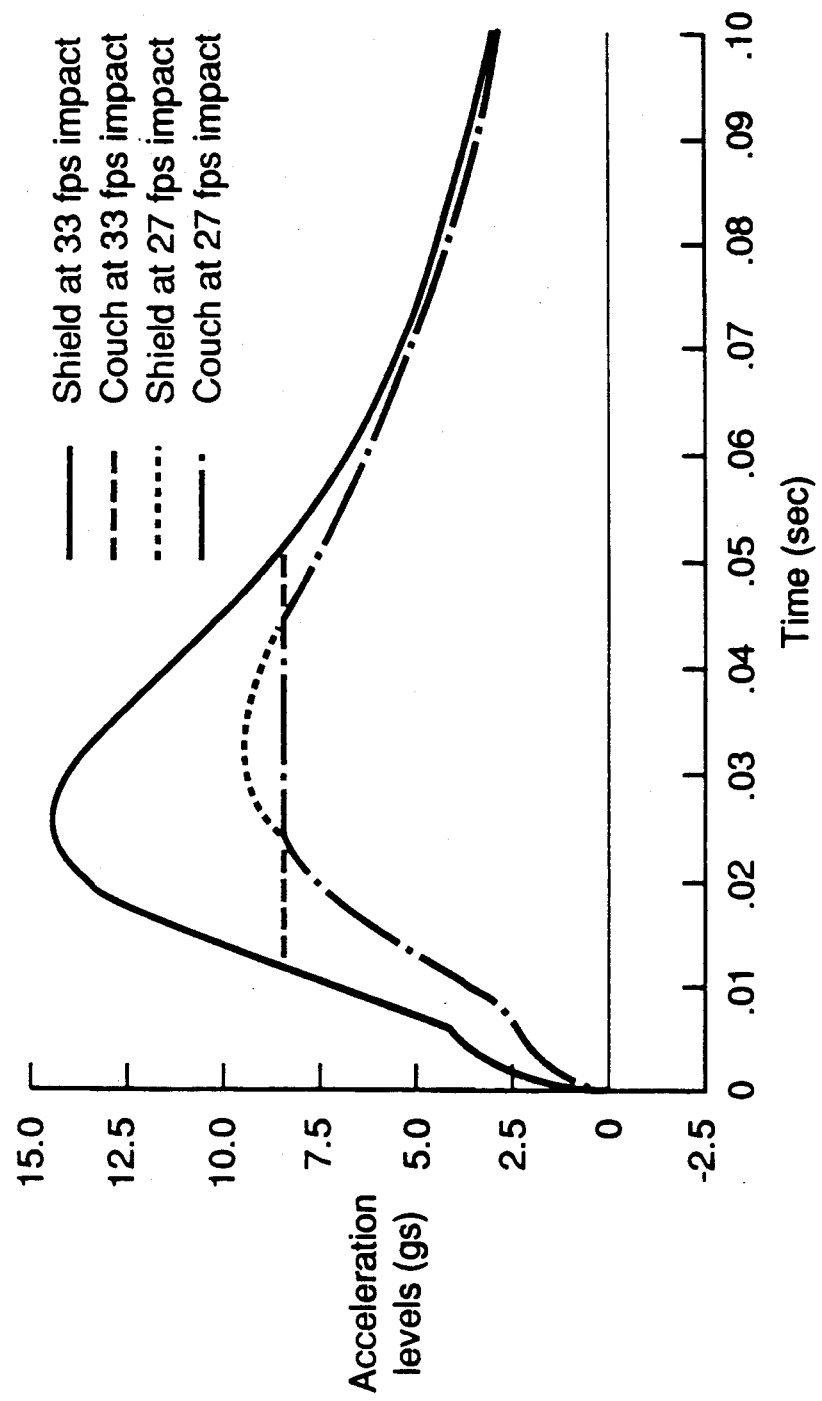
FIG. 29 is a graph showing acceleration versus time for water impact loads with two and three parachutes.

FIG. 29 shows a time history of the acceleration loads on both the crew couches and the vehicle for two vertical impact velocities; the higher impact velocity corresponds to a 2- parachute impact. In the case shown, the total return vehicle mass is 9146 lbm and the couches are attenuated to 8 g's. The small elbow within the first 0.01 second (in each curve) marks full impingement of the spherical nose. The 2-parachute impact peaks at about 14.5 g's, and the 3-parachute impact peaks near 9 g's. The couches can be seen to attenuate at 6 g's for about 0.02 second in the 3-parachute case and about 0.04 second in the 2-parachute case.

Figure 30:
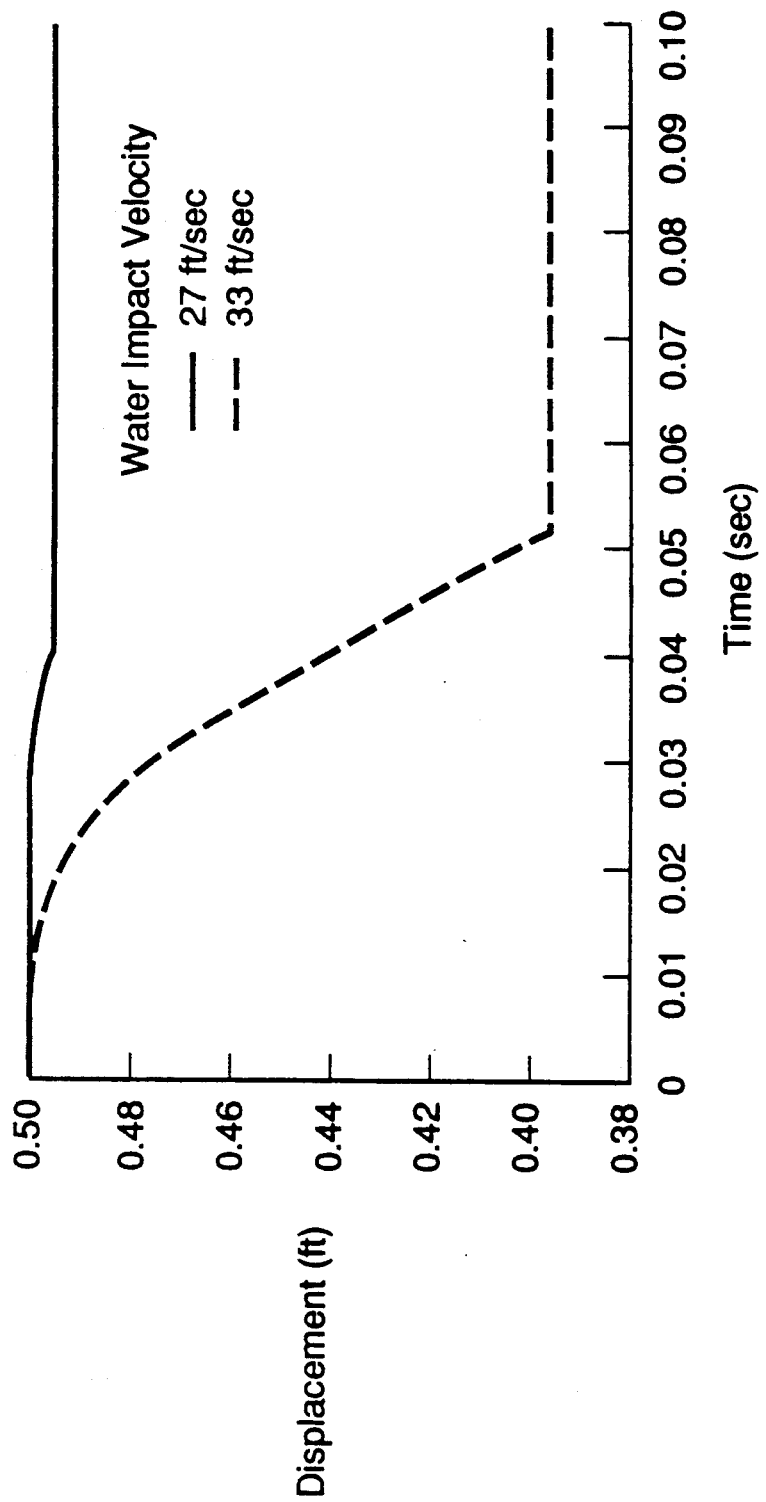
FIG. 30 is a graph showing couch shock attenuator displacement versus time for two impact velocities.
Figure 31:
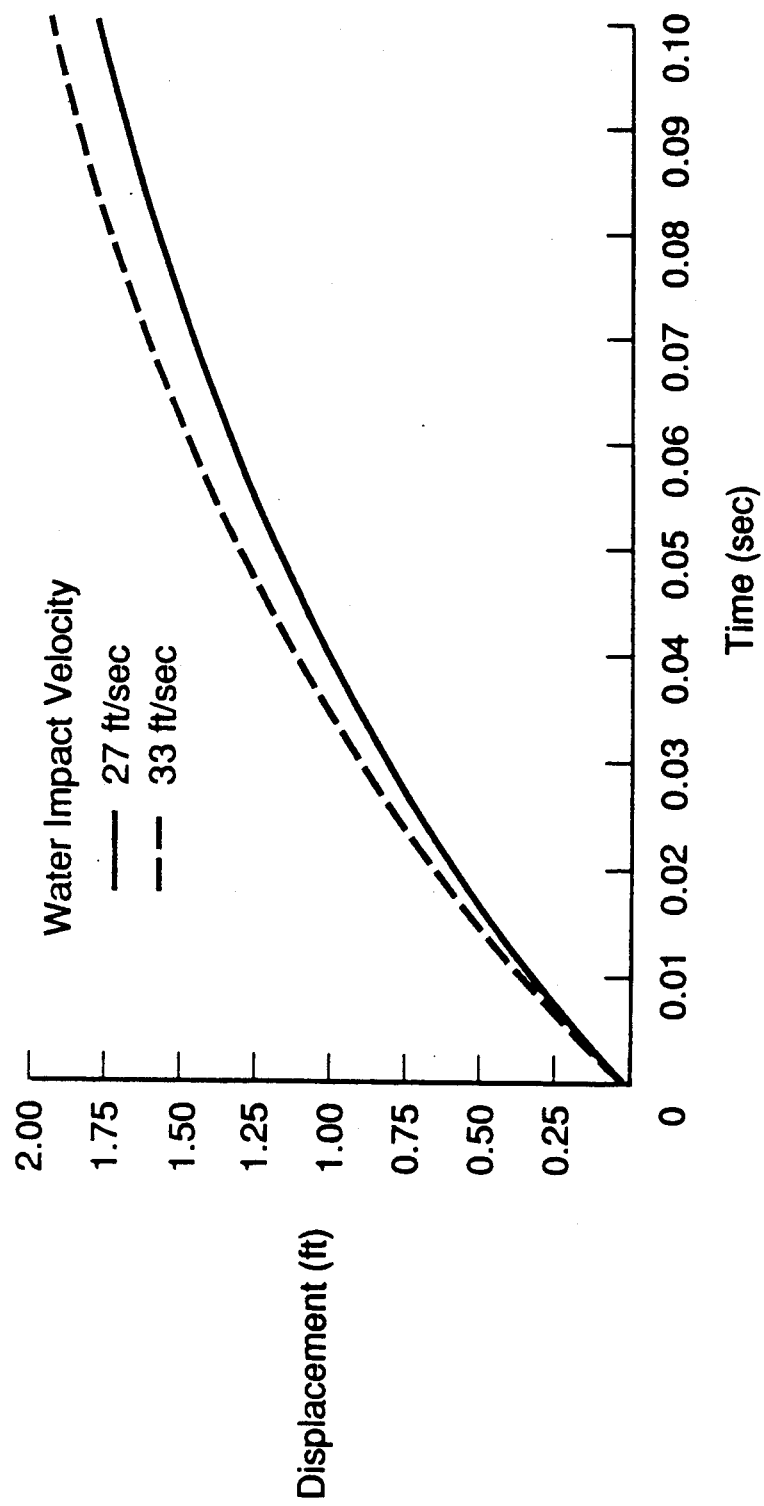
FIG. 31 is a graph showing water penetration versus time for two impact velocities.

Time histories for water penetration and couch shock attenuator displacements of the case in FIG. 29 are shown in FIGS. 30 and 31.

Figure 32:
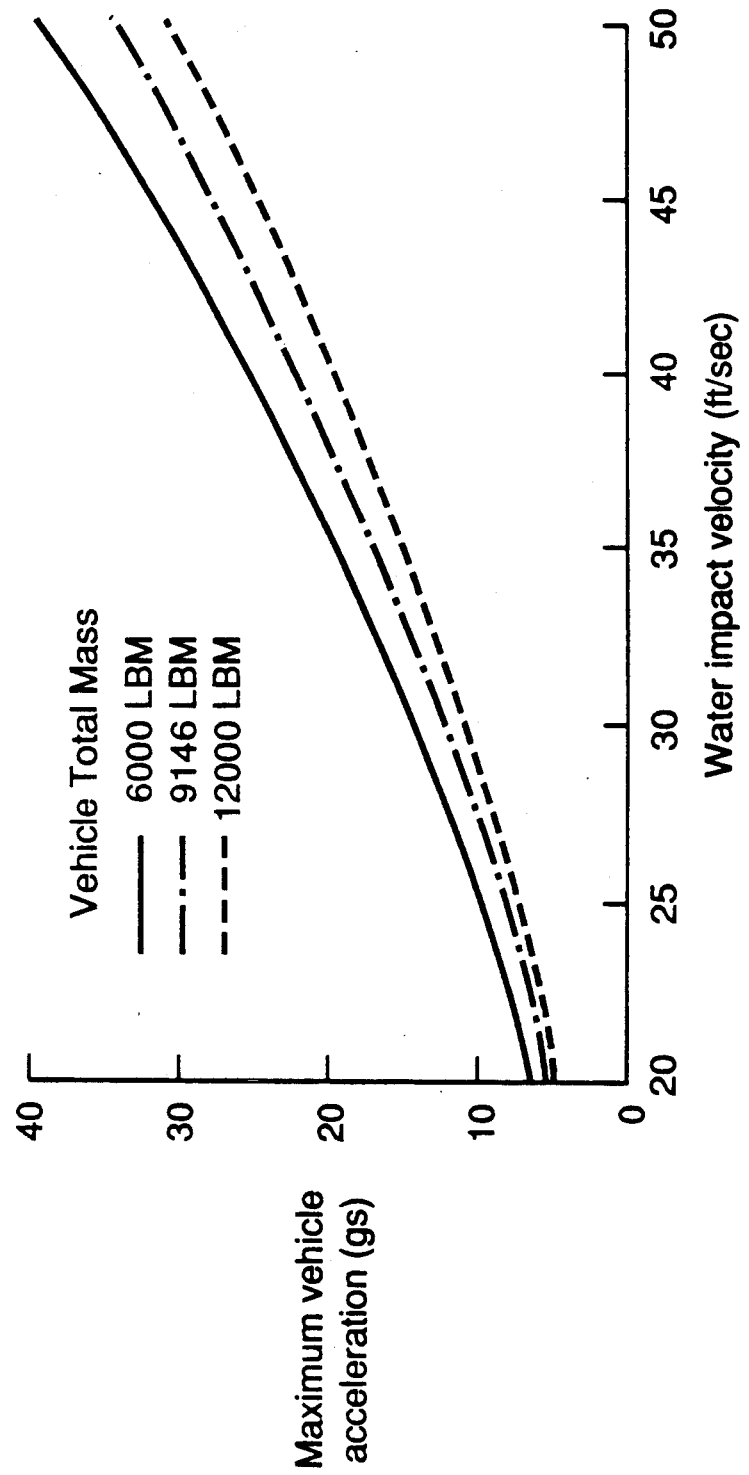
FIG. 32 is a graph showing maximum vehicle accelerations versus water impact velocities for different total vehicle mass.
Figure 33:
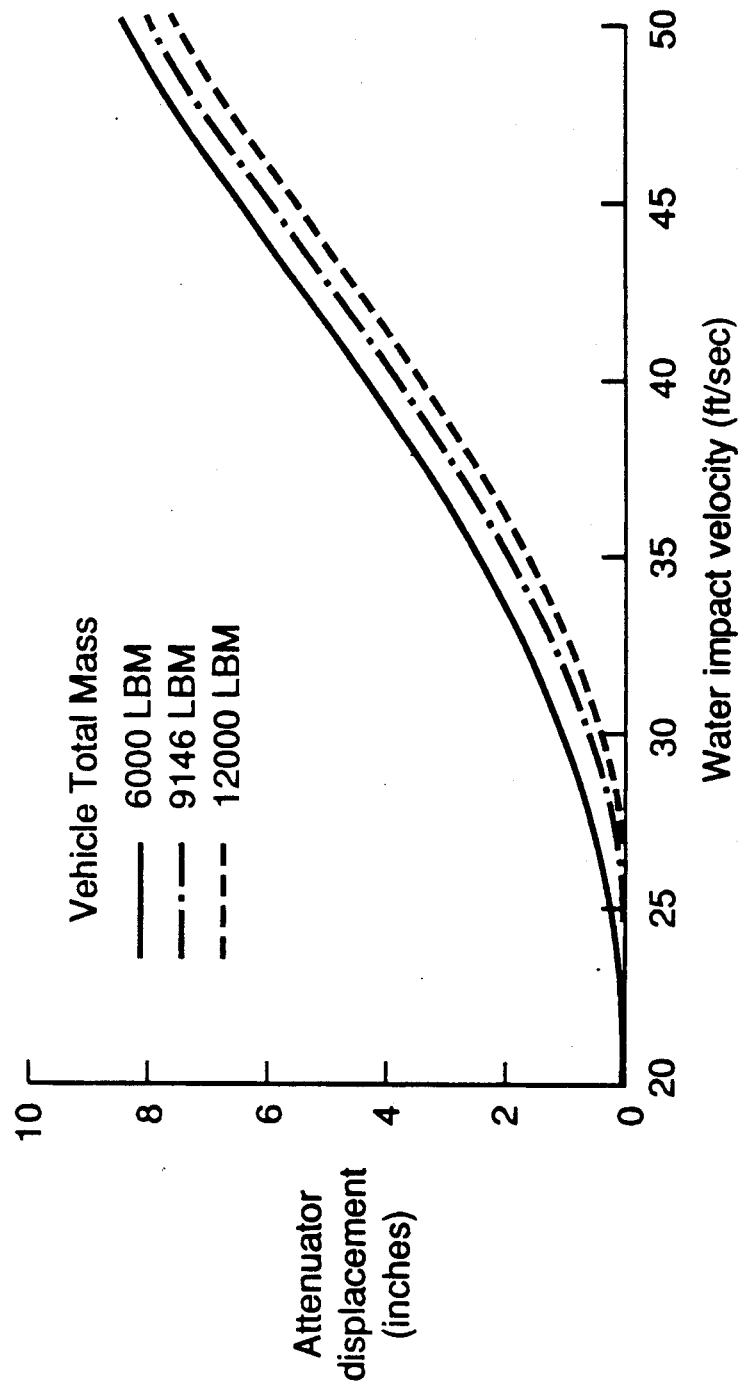
FIG. 33 is a graph showing attenuator displacement versus water impact velocity for different total vehicle mass.
Figure 34:
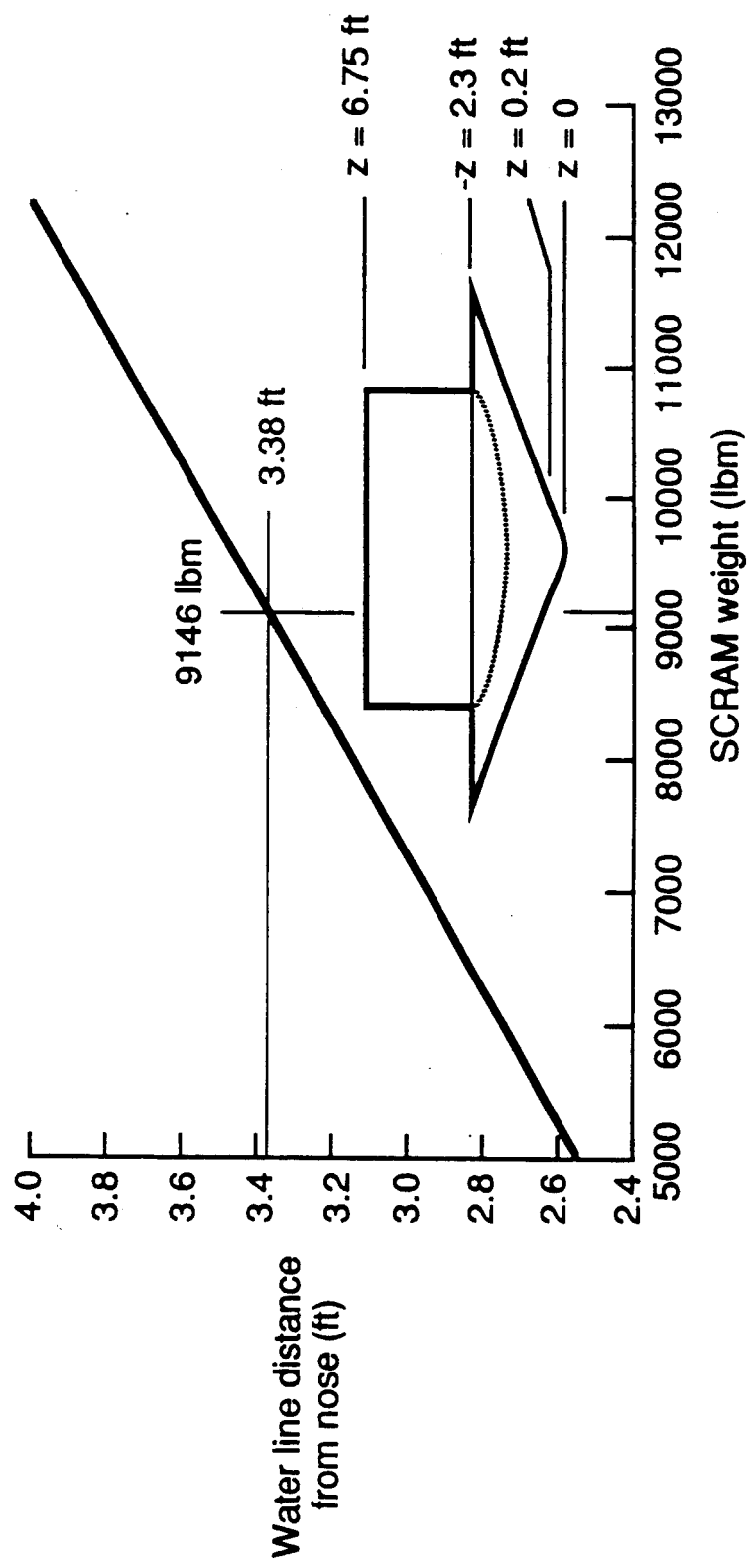
FIG. 34 is a graph showing mean equilibrium water line level as a function of vehicle weight.

FIGS. 32 and 34 show the results of a parametric study on peak impact loads and total shock attenuator displacements. Here, the couches are attenuated to 8 g's and the vehicle mass and impact velocity are varied. A vehicle weight of 9146 lbm represents the point design with the other two weights representing a weight growth and loss of roughly 30 percent. Impact velocities vary from 20 to 50 fps; the higher velocities give some insight into impact characteristics with a horizontal velocity component. Any weight growth can be seen to decrease both the peak g loads and the attenuator displacements for a given impact velocity. For the worst case of a 6,000 lbm return vehicle with a 50 fps vertical intact velocity, the peak load is roughly 39 g's and the shock attenuator will stroke about 8 in. Also noted is an elbow in the stroke about 8 in. Also noted is an elbow in the attenuator displacement curves between 25 and 30 fps impact velocities. This is also the velocity range where peak g loads begin to surpass shock attenuator limits.

Of final interest was the mean (calm sea state) steady state water line level on the vehicle. Very basically, this means that the buoyancy force equals the return vehicle weight. FIG. 34 shows the water location versus return vehicle weight given that the heat shield fills with 70 cubic feet of water (for stability purposes). For the weight range shown, the water line is always located on the constant diameter crew cabin; this leads to the linearity of the curve shown.

Recovery Considerations

1. Landing Footprints

Accuracy in hitting the desired target point plays a vital part in determining the amount of time required for rescue. It is expected that ground facilities will have computer codes identical to those onboard the return vehicle for providing options of landing sites available at the time of departure. Selection of a landing site could be transmitted via voice communication from the return vehicle crew or by ground tracking analyses. In any event, SAR forces will be mobilized at the base closest to the target point, probably even before the return vehicle deorbit burn. The effects of all trajectory dispersions must be considered to predict the possible area of landing footprint required for coverage. The landing footprint used in the following analyses was defined at an altitude of 25,000 ft or at drogue chute deployment.

a. Landing footprint Sensitivities

Contributions to the landing footprint include errors or uncertainties in deorbit impulse, navigation, vehicle mass, aerodynamics, and atmospheric density. The sensitivity of entry loads to these uncertainties are relatively benign, but the effects on downrange and crossrange are sizable. These effects are listed in Table 7 assuming no entry roll rate or closed-loop deorbit guidance. For example, the deorbit thrust or impulse could be in error and not corrected for if the burn duration were fixed; i.e., if a closed-loop guidance were not used. This would lead to a downrange miss distance of 24.5 n. mi. for every fps of impulse error. Likewise, errors of 27 n. mi. and 5.8 n. mi. in downrange and crossrange result from 1 deg uncertainties in thrust direction in-plane and out-of-plane, respectively.

TABLE 7

ENTRY LOAD EFFECTS ON DOWNRANGE AND CROSSRANGE

| Error Source | Miss Distance Sensitivity at 24000 ft |
|---|---|
| Deorbit burn magnitude | 24.5 n. mi./fps |
| Deorbit burn attitude | |
| In-plane | 27 n. mi./deg |
| Out-of-plane | 5.8 n. mi./deg |
| Vehicle deorbit weight | 0.8 n. mi./lb |
| Ignition delay | 35 n. mi./sec |
| Initial orbital altitude | 44 n. mi./n. mi |
| Density bias | 1 n. mi./percent bias |
| L/D | 161 n. mi. downrange/0.1 L/D |
| | 18 n mi. crossrange/0.1 L/D |

Footprint sensitivity to vehicle mass is 0.8 n. mi./lb - a critical factor if the number of crewmembers is variable. This is why the computer requires a real-time best estimate of crew weight. Another 35 n. mi. of landing error results from every second of deorbit ignition time error. An uncertainty in initial orbital altitude of 1 n. mi. will produce approximately 44 n. mi. of downrange error, and upper atmospheric density shifts of 1 percent result in a 1 n. mi. error.

The trim angle-of-attack also affects the landing footprint if the roll rate on entry is not established. The return vehicle would develop a 0.1 L/D for a 7 deg angle-of-attack which would occur with a 2 in. c.g. offset from the centerline. With this L/D held in a lift-up versus a lift-down orientation, the vehicle would attain a total downrange footprint of approximately 300 n. mi. If held at a 90 deg bank angle verses a −90 deg bank, the vehicle would cover 36 n. mi. crossrange.

b. Nominal Footprint

Again, the above sensitivities are witnessed if no closed-loop guidance or entry roll rate is utilized in the mission. The recommended return vehicle design will utilize a closed-loop burn duration deorbit and a 1 rpm roll rate during atmospheric entry. A simulation was generated including a crude but effective closed-loop deorbit, a coast period to entry, and a rolling entry to 25,000 ft. altitude. Given an initial altitude and vehicle weight estimate, guidance calculates a target point and controls the thrust duration to attempt to hit the target. A summary of the effects of uncertainties is given in Table 8.

If no uncertainties are introduced, the vehicle typically achieves a landing within +−1.4 n. mi. of the target. This is listed as a guidance accuaracy error. A number of initial altitudes and vehicles weights were used to establish this performance

TABLE 8

ESTIMATED FOOTPRINT OF CLOSED-LOOP GUIDANCE AND 1 RPM ENTRY ROLL RATE

| Error Source | Miss Distance (n. mi.) |
|---|---|
| Guidance accuracy error | +−1.4 |
| Navigation attitude error = +−0.43 deg | +−1.9 |
| Burn attitude error = +−0.10 deg | +−1.9 |
| Burn magnitude error = +−0.25 percent = +−1.13 fps | +−1.9 |
| Weight estimate error = +−20 lb | +−1.55 |
| Atmospheric density dispersion (GRAM) | +−29 |
| L/D(1 in. c.g. offset) = +−0.05 | +15 |
| RSS | +33/−29 |

It is estimated that the attitude error in handoff from the Space Station IMU to the return vehicle IMU could be as large as +−0.35 deg. and that the return vehicle IMU attitude may drift as much as +−0.04 deg./hr. Assuming 2 hours before deorbit burn, this implies that knowledge of the return vehicle attitude may be in error as much as +−0.43 deg. The attitude uncertainty would directly relate to an uncertainty in the thrust direction during deorbit. However, guidance was able to correct this misdirection with an adjusted burn duration and was still able to land within +−1.9 n. mi. of the target. Likewise, the error from the attitude control system deadband could be compensated for, resulting in a +−1.9 n. mi. error.

The Space Station will also handoff the state vector (position and velocity vectors) to the return vehicle IMU with some error. However, the magnitudes of these errors are expected to be small enough to cause little effect on the return vehicle landing footprint.

The engine thrust level was varied by +−0.25 percent. Again, guidance compensated with a thrust duration producing a +−1.9 n. mi. footprint capability. Vehicle weight uncertainties of +−20 lb caused landing errors of +−1.55 n. mi.

Deorbit guidance obviously cannot compensate for atmospheric density dispersions. To best estimate the effects of these dispersions, the global reference atmosphere model (GRAM) was employed in the simulation. This model produces random density perturbations and biases of the magnitudes witnessed in high altitude flights, as in Space Shuttle entries. A number of simulation cases were flown with the worst error in landing being 29 n. mi. from the target.

For L/D dispersions , a c.g. error of 1 in. from the centerline was assumed, producing an L/D of 0.05. Because of the 1 rpm entry roll rate, the lift effects are essentially canceled out, but the slightly reduced drag coefficient causes an overshoot of the target by 15 n. mi.

When these various contributions to the landing footprint are root sum squared (RSS'd), an estimated footprint of +33/−29 n. mi. about the target point is achieved. This error is primarily in downrange since crossrange effects are only incited by out-of-plane burn attitude dispersions. Estimates of the crossrange of the footprint are on the order of 2.5 n. mi.

c. Footprint of a Reduced Return Vehicle Design

A simplified version of the return vehicle can be achieved by eliminating the closed-loop deorbit burn guidance and simply thrusting for a predetermined fixed amount of time. The expected error sources and resulting footprint dispersions for this case are reported in Table 9. Thrust attitude and magnitude uncertainties as well as vehicle weight errors cause increased contributions to the footprint over that in the recommended design. The total resultant footprint would be +46/−44 n. mi. in downrange and +−3 n. mi. in crossrange.

Another alternative would be to maintain the closed-loop guidance but to eliminate the entry roll rate. The result would be increased downrange and crossrange errors due to lift generated by the assumed 1 in. c.g. offset. The total landing footprint is calculated to be +122/−72 n. mi. in downrange and +−18 n. mi. in crossrange. This is depicted in Table 10.

Elimination of both the closed-loop guidance and the entry roll rate would create a footprint of 126/−79 n. mi. in downrange and +−18 n. mi. in crossrange, as seen in Table 11.

Finally, an option of totally stripping the return vehicle of autonomy by replacing automatic control's with manual controls was looked at. In addition, an SRM was employed so that this option was as basic and simple as possible. Assessing the error sources is difficult due to the fact that manual attempts to control the vehicle throughout the deorbit burn are difficult to quantify and could even be catastrophic. Not only would there be a large penalty in crew training, but the landing footprint was also estimated to be approximately 450 n. mi. by 35 n. mi.

It is evident from these analyses that the entry roll rate is the most critical parameter in reducing dispersions in the ballistic return mission (besides computer and automated controls). Closed-loop deorbit guidance, although not as critical, was determined to be advantageous despite the additional cost in software.

TABLE 9

ESTIMATED FOOTPRINT OF OPEN-LOOP GUIDANCE AND 1 RPM ROLL RATE

| Error Source | Downrange Error (n. mi.) | Crossrange Error (n. mi.) |
|---|---|---|
| Navigation attitude error = +−0.43 deg | +−23 | +−2.5 |
| Burn attitude error = +−0.10 deg | +−3 | +−0.6 |
| Burn magnitude error = +−0.25 percent = +−1.13 fps | +−26 | |
| Weight estimate error = +−20 lb | +−16 | |
| Atmospheric density dispersion(GRAM) | +−29 | |
| L/D(1 in c.g. offset) = +−0.05 | +−15 | |
| RSS | +46/−44 | +−3 |

TABLE 10

ESTIMATED FOOTPRINT OF CLOSED-LOOP GUIDANCE AND NO ENTRY ROLL RATE

| Error Source | Downrange Error (n. mi.) | Crossrange Error (n. mi.) |
|---|---|---|
| Guidance accuracy error | +−1.4 | |
| Navigation attitude error = +−0.43 deg | +−1.9 | +−1.9 |
| Burn attitude error = +−0.10 deg | +−1.9 | +−1.9 |
| Burn magnitude error = +−0.25 percent = +−1.13 fps | +−1.9 | |
| Weight estimate error = +−20 lb | +−1.55 | |
| Atmospheric density dispersion | +−29 | |
| L/D (1 in c.g. offset) = +−0.05 | +118/−66 | +−17.5 |
| RSS | +122/−72 | +−18 |

TABLE 11

ESTIMATED FOOTPRINT OF OPEN-LOOP GUIDANCE AND NO ENTRY ROLL RATE

| Error Source | Downrange Error (n. mi.) | Crossrange Error (n. mi.) |
|---|---|---|
| Navigation attitude error = +−0.43 deg | +−12 | +−2.5 |
| Burn attitude error = +−0.10 deg | +−3 | +−0.6 |
| Burn magnitude error = +−0.25 percent = +−1.13 fps | +−26 | |
| Weight estimate error = +−20 lb | +−16 | |
| Atmospheric density dispersion (GRAM) | +−29 | |
| L/D (1 in c.g. offset) = +−0.05 | +−118/−66 | +−17.5 |
| RSS | +126/−79 | +−17.7 | d. Available Target Sites and Rescue Time

The return vehicle conceptual design has the capability to loiter on-orbit for up to 2 hours before executing the deorbit burn. A 2 hour loiter time is equivalent to about one revolution. Prior to entering the final orbit the crew will have the opportunity to select from several candidate landing sites. Once the site is selected, the vehicle will travel to the appropriate orbital position and initiate the deorbit burn. In developing the return vehicle, several landing sites were identified. These are listed in Table 12.

The orbits were approximated by a cosine function with a period of 337 deg. This approximation was within 2.5 deg of the "exact" orbital solution. Thirty-one orbits were simulated with the first orbit being that which passed over the Kennedy Space Center (KSC). On each orbit, the minimum distance to each landing site, or how close the orbit was to the landing site, was computed. For example, for the 20th orbit the closest landing site would be Diego Garcia, at which time the spacecraft would come within 282 miles, the closest the spacecraft would come to the other landing sites was up to 2855 miles.

The statistical or mean average distance from a landing site was about 159 miles with a standard deviation of 130 miles. The largest distance to the optimal site on any one orbit was about 430 miles. If the Dakar landing site were eliminated, the average distance missed would be about 212 miles with a standard deviation of 207 miles.

Based on this information and the assumption that SAR forces can travel from these sites at an average rate of 25 miles per hour (mph), the average stay time in the water would be less than 7 hours. It should be noted that, if restrictions on landing sites are imposed such as no landing in bad weather or in darkness, the average distance the return vehicle can land from the landing sites is sufficiently increased as is the recovery time.

TABLE 12

SELECTED LANDING SITES

| | Location | |
|---|---|---|
| Landing Site | Longitude (deg) | Latitude (deg) |
| 1. KSC | 279 | 28.5 |
| 2. Dakar | 342 | 15 |
| 3. Diego Garcia | 71 | −7 |
| 4. Okinawa | 126 | 27 |
| 5. Guam | 144 | 14 |
| 6. Fraser Island | 152 | −25 |
| 7. Hawaii | 201 | 22 |

A conceptual design of a ACRV has been developed to provide a benchmark assessment of a simple system for "punch out capability." The basic vehicle requirement was to get the Space Station crew safely back to Earth on demand. To minimize the use of active subsystems and consumables, on-orbit mission time was limited. Depending on the targeted landing site, rescue time after landing could be on the order of 1 day; therefore, the quality of the vehicle flotation dynamics was an important design consideration.

The design philosophy stressed that the subsystems be "off-the-shelf" which implies known reliability, a minimum of technology risk, and a good understanding of vehicle cost. Since vehicle weight is not a major constraint, the primary and secondary structures could be designed to more conservative "building codes," thus minimizing costly high-fidelity analysis and ground certification testing.

The return vehicle configuration is versatile and may accommodate more complex missions by enhancing the existing basic subsystems performance. Examples of such enhancements include: launching the crew on an expendable launch vehicle, entry and loiter performance to satisfy medical requirements, etc. In summary, the return vehicle or benchmark concept for an ACRV represents a low cost, low development time, safe, and reliable vehicle. This is predicated on utilizing NASA experience and technology developed in past industry and NASA programs.

We claim:

1. A method for safely and economically returning a human crew to earth from an earth orbiting craft, using a return vehicle attached to the orbiting craft and specially adapted for such use, comprising the steps;
    a) entering the return vehicle from the orbiting craft;
    b) starting individual crew breathing air supply;
    c) activating automatic controls of the return vehicle;
    d) initializing an inertial measuring unit aboard the return vehicle using state vector and attitude data obtained from the orbiting craft;
    e) releasing the return vehicle from the orbiting craft;
    f) updating periodically return vehicle state vectors and attitude using only onboard data;
    g) initiating automatically a reaction control system to maneuver the return vehicle away from the orbiting craft to preclude recontact between the return vehicle and the orbiting craft;
    h) entering crew weight into return vehicle computer;
    i) selecting manually one of a number of predetermined landing sites on the surface of the earth as a landing target;
    j) establishing automatically a return vehicle pre-burn attitude;
    k) calculating automatically a deorbit burn initiation time;
    l) firing automatically a deorbit thruster;
    m) maintaining automatically the proper return vehicle attitude throughout deorbit burn;
    n) terminating deorbit burn after elapse of appropriate time interval to effect desired ballistic trajectory for placing the return vehicle on the surface of the earth near the selected landing site;
    o) jettisoning the deorbit thruster;
    p) maneuvering the return vehicle automatically to ensure return vehicle trajectory and deorbit thruster trajectory do not intersect;
    q) establishing and maintaining automatically return vehicle entry attitude;
    r) initiating return vehicle roll rate; and
    s) deploying parachutes for decelerating return vehicle to acceptable impact velocity.

2. The method of claim 1 wherein step i) comprises the further steps:
    1) calculating automatically the return vehicle orbital groundtrack relative to the earth;
    2) comparing orbital groundtrack with stored landing site options; and
    3) displaying distances and times of landing of various landing sites.

3. The method of claim 1 wherein maintaining the proper return vehicle attitude throughout deorbit burn of step m) comprises maintaining only a 0-degree angle-of-attack.

4. The method of claim 1 wherein step n), terminating deorbit burn after elapse of appropriate time interval, comprises
    1) effecting target control by continuing the burn for a time sufficient to minimize the distance from landing point to selected target;
    2) checking periodically the predicted trajectory;
    3) verifying that heating and skipout atmospheric entry constraints are within acceptable limits for predicted trajectory; and
    4) overriding target control by terminating deorbit burn as required to keep atmospheric entry constraints within acceptable limits.

5. The method of claim 1 wherein step p), maneuvering automatically to ensure return vehicle trajectory and deorbit thruster trajectory do not intersect, further comprises
    1) firing reaction control system to move return vehicle laterally with respect to its previous ballistic trajectory; and
    2) firing reaction control system to remove any attitude instability induced by performance of step 1).

6. The method of effecting crew or cargo return to earth from earth orbit comprising the steps
    a) maintaining at an orbital location a return vehicle;
    b) providing to the return vehicle state vectors from an attached orbiting spacecraft;
    c) detaching the return vehicle from the orbiting spacecraft;
    d) calculating from the state vectors of the return vehicle one or more acceptable landing sites;
    e) selecting the desired landing site;
    f) automatically orienting the return vehicle attitude for a deorbit burn;
    g) initiating deorbit burn
    h) maintaining vehicle attitude during burn
    i) continuing deorbit burn for length of time sufficient to effect minimum distance from projected landing site to selected landing site;
    j) monitoring reentry parameters by periodically comparing with preselected limits;
    k) terminating deorbit burn prior to effecting minimum distance of step i) when necessary to keep reentry parameters within preselected limits.

* * * * *